US012073631B2

(12) United States Patent
Oyama

(10) Patent No.: US 12,073,631 B2
(45) Date of Patent: Aug. 27, 2024

(54) OBJECT ESTIMATION DEVICE, OBJECT ESTIMATION METHOD THEREFOR, AND VEHICLE

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 310 days.

(21) Appl. No.: 17/502,807

(22) Filed: Oct. 15, 2021

(65) Prior Publication Data
US 2022/0121864 A1 Apr. 21, 2022

(30) Foreign Application Priority Data
Oct. 21, 2020 (JP) ................................. 2020-176798

(51) Int. Cl.
*G06V 20/58* (2022.01)
*B60W 30/09* (2012.01)
(Continued)

(52) U.S. Cl.
CPC ............. *G06V 20/58* (2022.01); *B60W 30/09* (2013.01); *B60W 30/0956* (2013.01);
(Continued)

(58) Field of Classification Search
CPC .... G06V 20/58; G06V 10/22; G06V 2201/08; G06V 10/25; G06V 10/82; B60W 30/09;
(Continued)

(56) References Cited

U.S. PATENT DOCUMENTS 10,860,870 B2 * 12/2020 Noda ..................... B60W 30/08
2011/0010094 A1 * 1/2011 Simon .................... G08G 1/167
701/301
(Continued)

FOREIGN PATENT DOCUMENTS

| CN | 109872366 A | 6/2019 |
| JP | 2019-008460 A | 1/2019 |
| JP | 2020-013573 A | 1/2020 |
| JP | 2020-021188 A | 2/2020 |

OTHER PUBLICATIONS

Lingtao, Z. et.al. "Object Viewpoint Classification Based 3D Bounding Box Estimation for Autonomous Vehicles" School of Electronic and Information Engineering Xi'an Jiaotong University, Xi'an, China 710049, 6 pages, Sep. 3, 2019.
Office Action dated Jun. 18, 2024, from corresponding JP Application No. 2020-176798, 8 pages.

*Primary Examiner* — Aaron W Carter
(74) *Attorney, Agent, or Firm* — Rimon P.C.

(57) ABSTRACT

An object estimation device includes an acquisition unit and an estimation unit. The acquisition unit acquires a space image including an object present in a space. The estimation unit estimates image region data on the basis of a portion or all of the space image including the object. The image region data indicates a location of the object in the space image. On the condition that the object included in the space image acquired by the acquisition unit is included in an oblique posture, the estimation unit estimates an image region widened from an image region of the object included in the oblique posture in the space image, as the image region data.

15 Claims, 9 Drawing Sheets

(51) Int. Cl.
  *B60W 30/095* (2012.01)
  *G06F 18/21* (2023.01)
  *G06T 7/73* (2017.01)
  *G06V 10/22* (2022.01)

(52) U.S. Cl.
  CPC ............... *G06F 18/21* (2023.01); *G06T 7/73* (2017.01); *G06V 10/22* (2022.01); *B60W 2420/403* (2013.01); *B60W 2554/4041* (2020.02); *B60W 2554/4044* (2020.02); *B60W 2554/80* (2020.02); *G06T 2207/20081* (2013.01); *G06T 2207/20084* (2013.01); *G06T 2207/30252* (2013.01); *G06V 2201/08* (2022.01)

(58) Field of Classification Search
  CPC ......... B60W 30/0956; B60W 2420/42; B60W 2554/4041; B60W 2554/4044; B60W 2554/80; G06F 18/21; G06T 7/73; G06T 2207/20081; G06T 2207/20084; G06T 2207/30252; G06N 3/08
  See application file for complete search history.

(56) References Cited

U.S. PATENT DOCUMENTS

| | | | |
|---|---|---|---|
| 2016/0055382 A1* | 2/2016 | Horie | G06T 7/248 382/104 |
| 2018/0373942 A1 | 12/2018 | Noda et al. | |
| 2019/0114788 A1* | 4/2019 | Aizawa | G06T 7/248 |
| 2019/0139231 A1* | 5/2019 | Aizawa | G06T 7/00 |
| 2019/0195623 A1* | 6/2019 | Deutsch | G01M 11/067 |
| 2020/0005485 A1 | 1/2020 | Xu et al. | |
| 2020/0026905 A1 | 1/2020 | Karg et al. | |
| 2020/0184250 A1* | 6/2020 | Oko | G06V 20/56 |
| 2020/0384929 A1* | 12/2020 | Kobayashi | B60R 11/04 |
| 2021/0309214 A1* | 10/2021 | Hashimoto | G06V 20/58 |
| 2021/0312198 A1* | 10/2021 | Hashimoto | G06V 20/584 |
| 2022/0020158 A1* | 1/2022 | Ning | H04N 5/2628 |
| 2022/0058428 A1* | 2/2022 | Matsunaga | G06F 18/213 |
| 2022/0092876 A1* | 3/2022 | Shokonji | G06V 20/58 |
| 2022/0121864 A1* | 4/2022 | Oyama | G06V 10/82 |
| 2023/0115845 A1* | 4/2023 | Hiramatsu | G06V 20/588 701/26 |

* cited by examiner

OBJECT ESTIMATION DEVICE, OBJECT ESTIMATION METHOD THEREFOR, AND VEHICLE

This application claims priority from Japanese Patent Application No. 2020-176798 filed on Oct. 21, 2020, the entire contents of which are hereby incorporated by reference.

BACKGROUND

The technology relates to an object estimation device, an object estimation method for the object estimation device, and a vehicle.

Vehicles such as automobiles are expected to capture the surroundings around an automobile as an own vehicle with a camera provided in the automobile, to estimate a location of an object on the basis of the captured image, and to be able to travel avoiding, for example, the location of the object. Examples of the object may include a surrounding vehicle present around the automobile.

For example, Japanese Unexamined Patent Application Publication (JP-A) No. 2019-008460 discloses an object estimation device that learns, estimates, and outputs a posture and a relative distance of an object in a presumed object region detected in a captured image. The use of the posture and the relative distance of the object obtained in accordance with JP-A No. 2019-008460 makes it possible for a vehicle to move avoiding a location of the object estimated.

SUMMARY

An aspect of the technology provides an object estimation device including an acquisition unit and an estimation unit. The acquisition unit is configured to acquire a space image including an object present in a space. The estimation unit is configured to estimate image region data on the basis of a portion or all of the space image including the object. The space image is acquired by the acquisition unit. The image region data indicates a location of the object in the space image. On the condition that the object included in the space image acquired by the acquisition unit is included in an oblique posture, the estimation unit is configured to estimate an image region widened from an image region of the object included in the oblique posture in the space image, as the image region data that indicates the location of the object in the space image.

An aspect of the technology provides an object estimation method for an object estimation device configured to estimate image region data. The image region data indicates a location of an object in a space image including the object present in a space. The object estimation method includes: acquiring the space image including the object present in the space; and estimating the image region data on the basis of a portion or all of the space image including the object. The space image is acquired by the acquiring. The image region data indicates the location of the object in the space image. On the condition that the object included in the space image acquired by the acquiring is included in an oblique posture, the estimating includes estimating an image region widened from an image region of the object included in the oblique posture in the space image, as the image region data that indicates the location of the object in the space image.

An aspect of the technology provides a vehicle including an imaging device, a processor, and a control processor. The imaging device is configured to capture a space around a vehicle. The processor is configured to carry out processing on a captured image by the imaging device. The control processor is configured to control travel of the vehicle with use of a result of the processing by the processor. The processor includes an acquisition unit, an estimation unit, and a post-processing unit. The acquisition unit is configured to acquire the captured image as a space image including an object present in the space. The estimation unit is configured to estimate image region data on the basis of a portion or all of the space image including the object. The space image is acquired by the acquisition unit. The image region data indicates a location of the object in the space image. The post-processing unit is configured to generate a position, a direction, a distance, or any combination thereof with respect to the object present in the space, with the use of the image region data generated by the estimation unit. On the condition that the object included in the space image acquired by the acquisition unit is included in an oblique posture, the estimation unit is configured to estimate an image region widened from an image region of the object included in the oblique posture in the space image, as the image region data that indicates the location of the object in the space image. The control processor is configured to decide, with the use of the position, the direction, the distance, or any combination thereof with respect to the object present in the space estimated by the post-processing unit as the result of the processing by the processor, a course or a travelable range of the vehicle to control the travel of the vehicle. The course or the travelable range inhibits the vehicle from coming into contact with the object included in the oblique posture in the space image.

An aspect of the technology provides an object estimation device including circuitry. The circuitry is configured to acquire a space image including an object present in a space. The circuitry is configured to estimate image region data on the basis of a portion or all of the space image including the object. The image region data indicates a location of the object in the space image. On the condition that the object included in the space image is included in an oblique posture, the circuitry is configured to estimate an image region widened from an image region of the object included in the oblique posture in the space image, as the image region data that indicates the location of the object in the space image.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
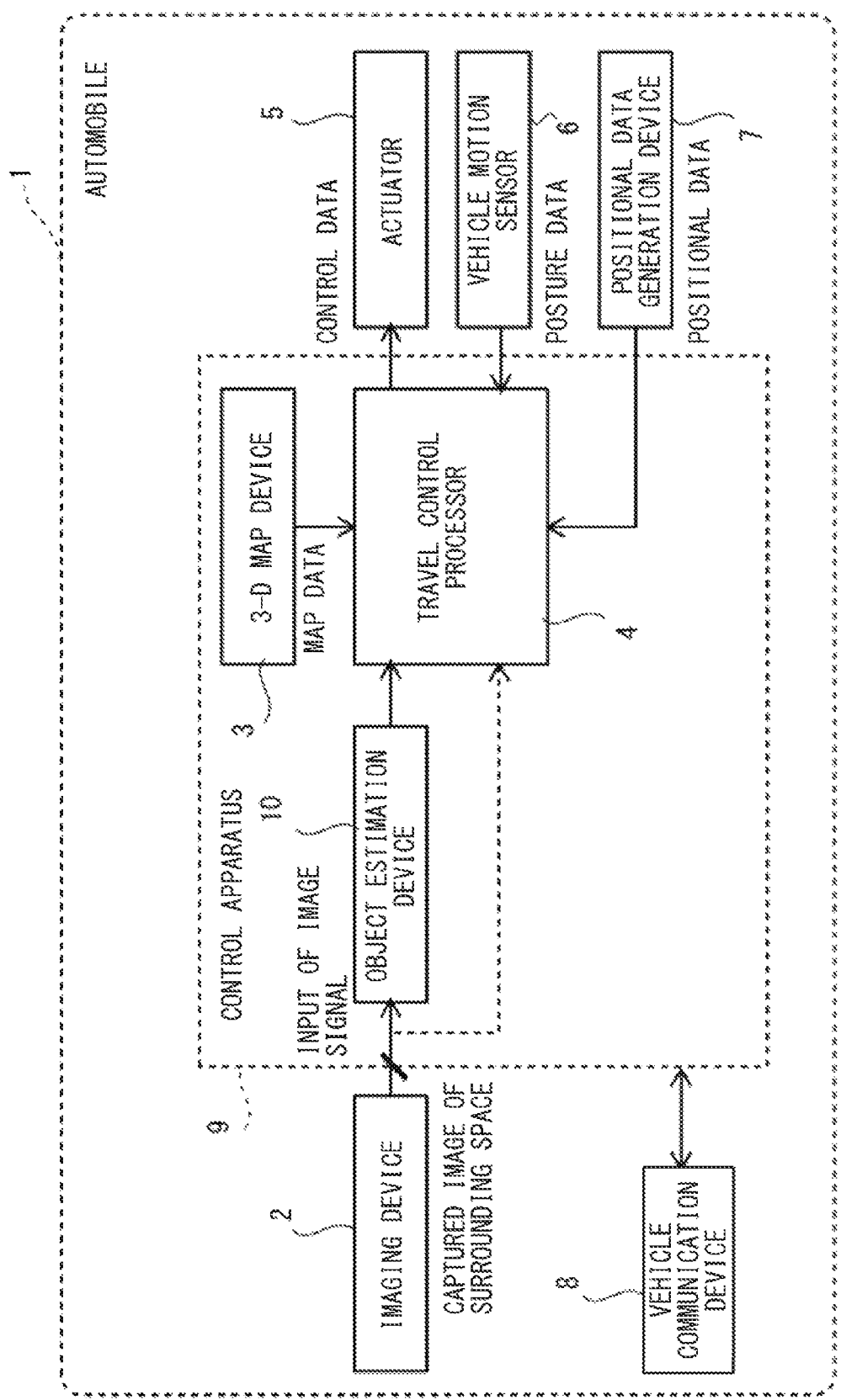
FIG. 1 is an explanatory diagram of a control system of an automobile configured to provide autonomous driver assistance or automated driving, according to an embodiment of the technology.

A neural network disclosed in JP-A No. 2019-008460 simply uses a captured image and an estimation frame as teacher data, to machine-learn their relevance. The estimation frame encloses an image region of an object in the captured image.

In this case, the neural network basically associates the estimation frame with the image region of the object in the captured image. This results in a large error between a location of the object, e.g., a vehicle, in the real space and a location estimated on the basis of the estimation frame that encloses the image region of the object in the captured image.

For example, let us assume a case where the vehicle as the object included in the captured image is included, in the captured image, in an oblique posture to a viewpoint position of the captured image. In such a case, a front end of the vehicle in the real space is protruded toward the viewpoint position of the captured image from the estimation frame. The estimation frame indicates the location of the vehicle estimated on the basis of the image region of the vehicle in the captured image. One reason for this is that an outline of the vehicle is not a cubic shape which is generally assumed in such an estimation process. The error caused by this assumption becomes considerably large, particularly because automobiles in recent years have more rounded, or less angled, outlines than existing automobiles, to enhance safety when they come in contact with people outside the vehicle, e.g., pedestrians. As a result, for example, an automobile that is being controlled to pass near the estimated location of the object may come into contact with the object under a normal control.

As described, the estimation of locations of objects has left much to be improved.

Some example embodiments of the technology will now be described in detail with reference to the accompanying drawings. Note that sizes, materials, specific values, and any other factors illustrated in respective example embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals without any redundant description. Further, elements that are not directly related to the technology are not illustrated in the drawings. The drawings are schematic and are not intended to be drawn to scale.

FIG. 1 is an explanatory diagram of a control system of an automobile 1 configured to provide autonomous driver assistance or automated driving, according to an embodiment of the disclosure.

In one embodiment of the disclosure, the automobile 1 may serve as a "vehicle".

The automobile 1 in FIG. 1 may include an imaging device 2, an object estimation device 10, a three-dimensional (3-D) map device 3, a travel control processor 4, an actuator 5, a vehicle motion sensor 6, a positional data generation device 7, and a vehicle communication device 8. The imaging device 2 may capture surroundings of the automobile 1, or an outside of the automobile 1, to generate a captured image. The object estimation device 10, the three-dimensional map device 3, and the travel control processor 4 may serve as a control apparatus of the automobile 1. The control apparatus is configured to control travel of the automobile 1.

The actuator 5 may control operation of unillustrated devices that realize the travel of the automobile 1, such as an engine, a motor, a transmission, a braking device, and a steering device, without limitation. The actuator 5 may be provided in a plurality, for example, per device.

The vehicle motion sensor 6 may detect a motion of the automobile 1 caused by, for example, the travel of the automobile 1. The vehicle motion sensor 6 may include, for example, an acceleration rate sensor or a speed sensor. The acceleration rate sensor may detect, for example, acceleration rates of the automobile 1 in three axial directions, i.e., longitudinal, lateral, and vertical directions. The speed sensor may detect, for example, speeds of the automobile 1 in the three axial directions, i.e., the longitudinal, lateral, and vertical directions. The vehicle motion sensor 6 may detect the motions of the automobile 1 caused by the travel of the automobile 1 and output detected data to the travel control processor 4.

The travel control processor 4 may control the travel of the automobile 1, and output a control signal to the actuator 5. For example, the travel control processor 4 may control the travel of the automobile 1 on the basis of driving operations of an occupant, or alternatively, the travel control processor 4 may control the travel of the automobile 1 by automated driving. The travel control processor 4 may provide driver assistance to adjust the travel of the automobile 1 by manual driving or automated driving with the use of various kinds of data detected or generated by the own vehicle. The automobile 1 configured to travel in this way is able to travel by autonomous driver assistance or automated driving.

The positional data generation device 7 may receive radio waves from, for example, GNSS (Global Navigation Satellite System) satellites, and generate a current position and current time of the automobile 1 in which the positional data generation device 7 is provided. The positional data generation device 7 may output the current position and the current time thus generated of the automobile 1 to the travel control processor 4.

The three-dimensional map device 3 may output, for example, map data around the current position of the automobile 1 to the travel control processor 4.

The imaging device 2 may be provided in the automobile 1 to capture a surrounding space around the automobile 1.

The imaging device 2 may include, for example, a monocular camera device. The monocular camera device may be provided in an upper portion of a front windshield, and oriented forward of the automobile 1, for example. In this case, the monocular camera device may capture the surrounding space around the automobile 1 in a forward direction, i.e., a traveling direction of the automobile 1, generate the captured image in a two-dimensional plane, and output the captured image of a predetermined signal format. An image signal including the captured image detected may be outputted from the imaging device 2, transmitted to the control apparatus, and inputted to the control apparatus. The image signal for the captured image may be branched in the control apparatus, and inputted to the object estimation device 10 and to the travel control processor 4. A plurality of the imaging devices 2 may be provided in the automobile 1. For example, the plurality of the imaging devices 2 may be oriented toward four directions to avoid overlap between their viewing angles, to capture images of the surroundings of the automobile 1 in all directions through 360 degrees. In this case, the control apparatus, the object estimation device 10, and the travel control processor 4 may be supplied with a plurality of the image signals for the captured images from the plurality of the imaging devices 2. It is to be noted that the imaging device 2 may include a compound-eye camera device such as a stereo camera device, without limitation. The compound-eye camera device may output one of a plurality of images captured by a plurality of cameras, or an image obtained by synthesizing all of the plurality of the images captured by the plurality of the cameras, to the control apparatus, the object estimation device 10, and the travel control processor 4.

The vehicle communication device 8 may communicate with the outside of the automobile 1. The vehicle communication device 8 may generate a communication path with, for example, a base station of a mobile communication network, a base station of a traffic data distribution network, a moving object such as a surrounding automobile 100, a mobile terminal carried by a pedestrian, etc., or a communication satellite, without limitation. The vehicle communication device 8 may transmit and receive data to and from an unillustrated server device through the communication path generated. The vehicle communication device 8 may output, for example, data received from the server device to the control apparatus. The vehicle communication device 8 may transmit data transmitted from the control apparatus to, for example, the server device. Non-limiting examples of the received data may include: a path, a course, and a travelable range for automated driving; current or future positions, traveling speeds, and traveling directions of nearby surrounding automobiles 100; and the captured images of the surrounding space. Non-limiting examples of the transmitted data may include: a current or future position, a traveling speed, a traveling direction, a course, an assumed travel range, and a path of the automobile 1 as an own vehicle.

The object estimation device 10 may include a processor configured to carry out processing on the captured image of the surrounding space by the imaging device 2. The object estimation device 10 may output a result of the processing on the captured image to the travel control processor 4. The object estimation device 10 may output, for example, a relative position, a relative direction, and a relative interval, or a relative distance, of a surrounding moving object included in the captured image, as surrounding vehicle data to the travel control processor 4.

The travel control processor 4 may control the autonomous travel of the automobile 1 with the use of the data obtained from these devices. For example, with the use of the result of the processing on the captured image by the object estimation device 10, the travel control processor 4 may control the travel of the automobile 1.

Although not illustrated, elements in FIG. 1 may be coupled to one another through a vehicle network of the control system provided in the automobile 1. Non-limiting examples of the vehicle network may include a CAN (Controller Area Network), a LIN (Local Interconnect Network), a LAN (Local Area Network), FlexRay, a CXPI (Clock Extension Peripheral Interface). The vehicle network may include, for example, a plurality of bus cables coupled to a plurality of devices, and a central gateway (CGW) as a relay device to which the plurality of the bus cables is bus-coupled. A plurality of control ECUs may transmit and receive data by mutually transmitting and receiving messages through the vehicle network. Thus, elements provided in the control system of the automobile 1 may control the automobile 1 in cooperation.

Figure 2A:
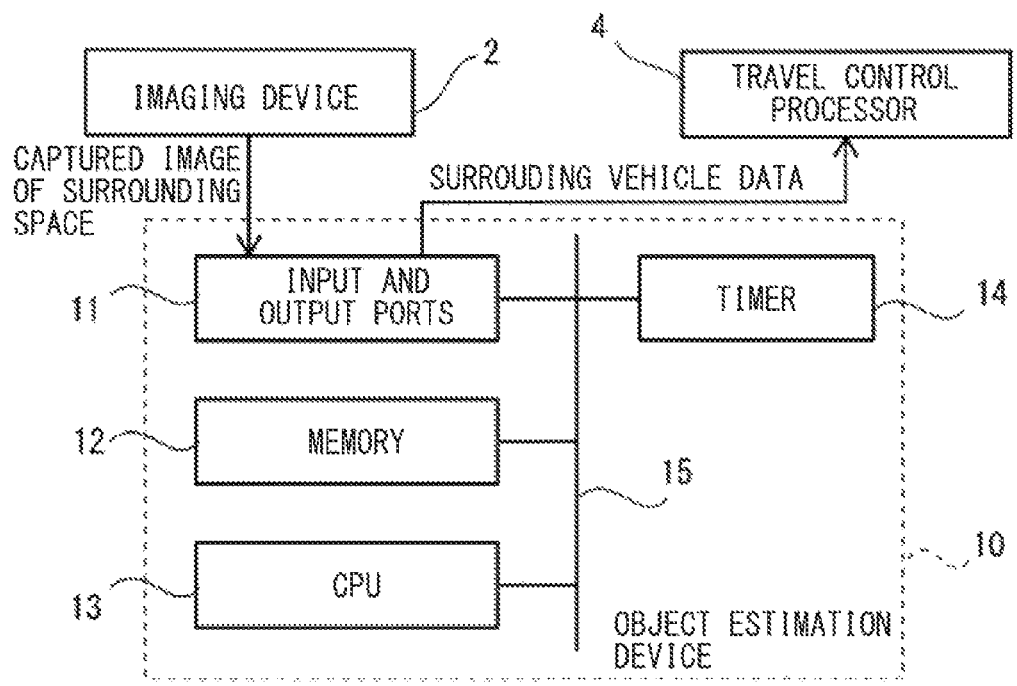
FIGS. 2A and 2B are explanatory diagrams of an object estimation device in FIG. 1.
Figure 2B:
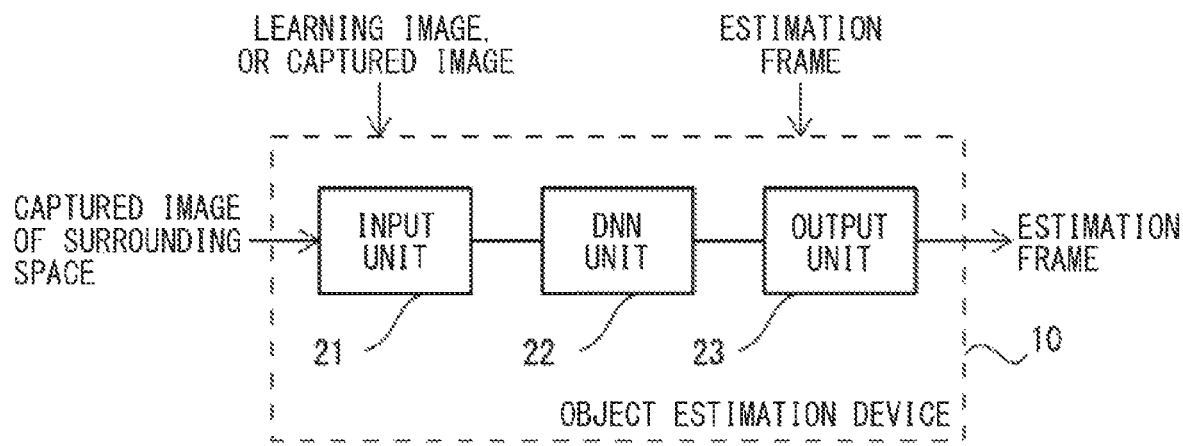

FIGS. 2A and 2B are explanatory diagrams of the object estimation device 10 in FIG. 1.

FIG. 2A is an explanatory diagram of a hardware configuration of the object estimation device 10 in FIG. 1.

The object estimation device 10 in FIG. 2A may include, without limitation, input and output ports 11, a memory 12, a CPU 13, a timer 14, and an internal bus 15. To the internal bus 15, the input and output ports 11, the memory 12, the CPU 13, and the timer 14 are coupled.

The input and output ports 11 may serve as a physical output unit 23 (see FIG. 2B) of the object estimation device 10. The imaging device 2 and the travel control processor 4 may be coupled to the input and output ports 11.

For example, the input and output ports 11 may include an input terminal dedicated to an image signal. The input terminal may be coupled to the imaging device 2, and supplied with the captured image by the imaging device 2 in the predetermined signal format. The input terminal dedicated to the image signal may include, without limitation, a video terminal.

The timer 14 may measure time and time periods.

The memory 12 may hold programs to be executed by the CPU 13, and data. Non-limiting examples of the data may include setting data and running data. The memory 12 may include, without limitation, a ROM, a RAM, a recording disk, and a semiconductor memory. The memory 12 may be volatile or nonvolatile, but at least the programs to be executed by the CPU 13 and the setting data may be held by the nonvolatile memory 12.

The CPU 13 may include, without limitation, a general-purpose CPU 13 used in a data processor, an ECU used in the automobile 1, or a GPU and an ASIC. The GPU and the ASIC have high performance in special processing such as image processing. The CPU 13 may read and execute the programs held in the memory 12. Thus, the CPU 13 may serve as an "acquisition unit" configured to acquire the captured image of the surrounding space by the imaging device 2, and a "processor" configured to carry out processing on the captured image acquired.

The CPU 13 may acquire, for example, the captured image of the surrounding space, from the input and output ports 11 through the internal bus 15, to carry out, for example, estimation processing with respect to an object included in the captured image. The captured image is superposed on the image signal from the imaging device 2. The CPU 13 may output data regarding a result of the processing on the object with respect to the captured image, to the input and output ports 11 through the internal bus 15.

The data outputted to the input and output ports 11 regarding the result of the processing on the object with respect to the captured image may be outputted to the travel control processor 4.

FIG. 2B is an explanatory diagram of a deep learning neural network (DNN) to be provided in the object estimation device 10 in FIG. 2A.

The CPU 13 may read the programs held by the memory 12 and execute the programs, to provide the deep learning neural network in FIG. 2B in the object estimation device 10.

The deep learning neural network to be provided in the object estimation device 10 in FIG. 2B may include, without limitation, an input unit 21, a DNN unit 22, and the output unit 23.

The DNN unit 22 may perform estimation processing on the basis of a learned model obtained by machine-learning the relevance between the learning image and an estimation frame. The estimation frame is a result of estimation with respect to the learning image. The DNN unit 22 may have, for example, a multistage signal processing structure that simulates a neural network.

The learning image may be the captured image of the surrounding space by the imaging device 2, an image regarding a virtual space, or a mixture of these.

The estimation frame is data indicating the location in the image of an object included in the learned image, e.g., another automobile, or a surrounding automobile 100, illustrated in FIGS. 5A and 5B described later.

On the basis of an input of the learned image and an input of the estimation frame, the DNN unit 22 may learn the relevance between the learned image and the estimation frame. The estimation frame indicates the location in the image of the surrounding automobile 100 included in the image.

Thus, the DNN unit 22 may generate, for example, a parameter regarding the relevance to obtain the estimation frame from the image. The memory 12 may hold the parameter regarding the relevance, as well as a neural network program for the DNN unit 22.

The DNN unit 22, after finishing such learning, may be supplied by the input unit 21 with the captured image of the surrounding space by the imaging device 2, and thereupon, the DNN unit 22 may perform the estimation processing by the neural network with respect to the captured image supplied. Thus, the DNN unit 22 may output the estimation frame through the output unit 23. The estimation frame indicates the location of the surrounding automobile 100 in the image.

It is to be noted that the CPU 13 may determine whether or not an image component of the surrounding automobile 100 is included in the captured image. In a case where the image component of the surrounding automobile 100 is included, the CPU 13, as the DNN unit 22, may execute the estimation processing on at least a portion that includes the image component of the surrounding automobile 100. In this case, the CPU 13, as the DNN unit 22, may learn not the whole image that partially includes the surrounding automobile 100 but a partial image of a slightly larger size than the image region of the surrounding automobile 100, to learn the relevance between the image to be learned and the estimation frame indicating the location of the surrounding automobile 100 in the image.

As described above, the CPU 13 of the object estimation device 10 is configured to machine-learn the relevance between the space image and the estimation frame. The space image includes an object present in the real space, e.g., the surrounding automobile 100. The estimation frame indicates the location of the object in the space image. On the basis of the relevance learned, the CPU 13 is configured to estimate the estimation frame indicating the location of the surrounding automobile 100 included in the captured image of the surrounding space by the imaging device 2.

Figure 3A:
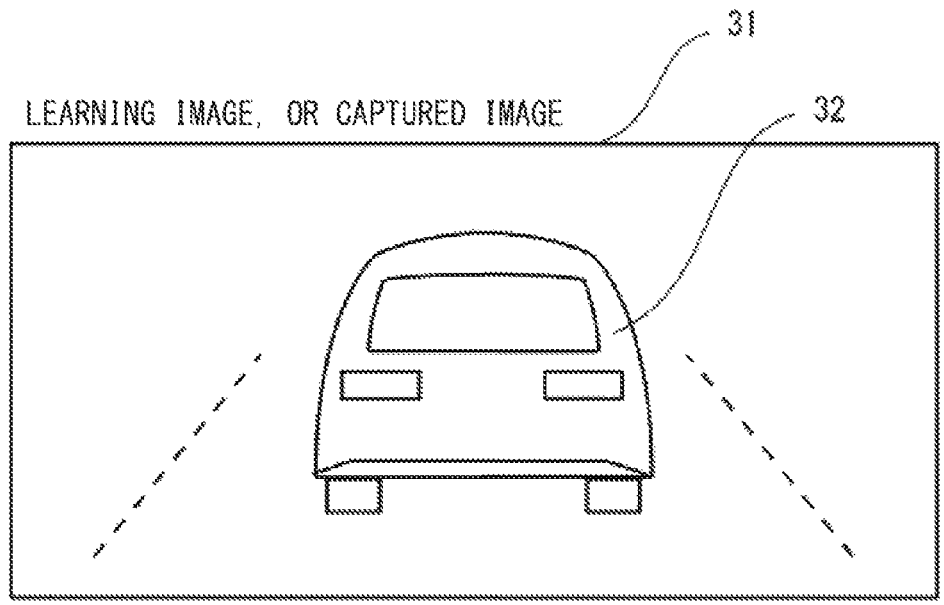
FIGS. 3A and 3B are explanatory diagrams of examples of learning images to be learned by a deep learning neural network in FIG. 2B.
Figure 3B:
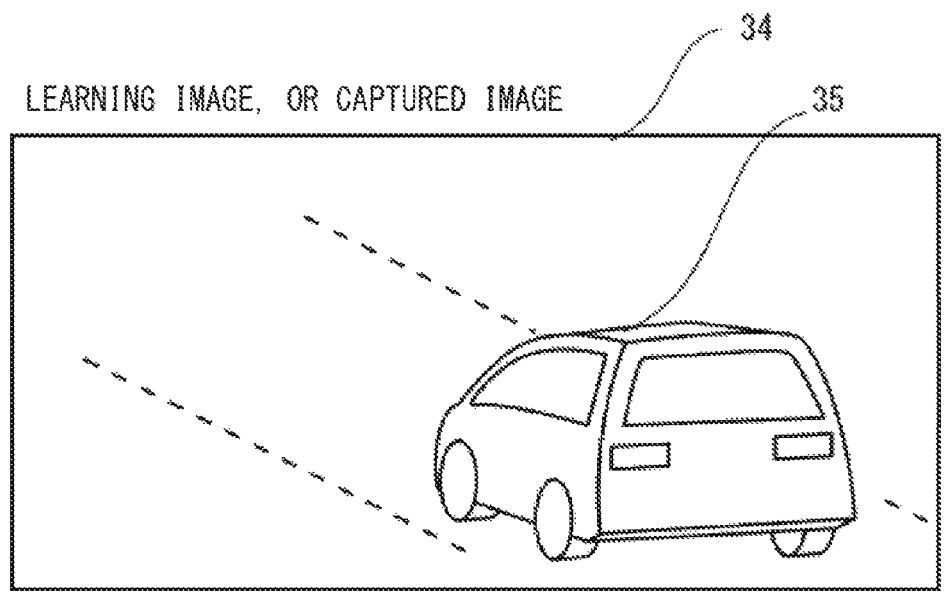

FIGS. 3A and 3B are explanatory diagrams of examples of the learning images to be learned by the deep learning neural network in FIG. 2B. In one embodiment of the disclosure, the learning image may serve as a "space image". In one embodiment of the disclosure, the captured image may also serve as the "space image".

FIG. 3A illustrates a learning image 31 of the surrounding automobile 100 as captured from behind. The surrounding automobile 100 is traveling in front of the automobile 1 as the own vehicle.

In this case, the surrounding automobile 100 is included in the learning image 31, in a posture with its rear face opposed to the viewpoint position of the learning image 31. The rear face of the surrounding automobile 100 as an object included in the learning image 31 serves as a confronted face opposed to the viewpoint position of the learning image 31. The learning image 31 includes an image region 32 of the rear face of the surrounding automobile 100.

FIG. 3B illustrates a learning image 34 of the surrounding automobile 100 as captured from obliquely behind. The surrounding automobile 100 is a preceding automobile. The surrounding automobile 100 is traveling, for example, on an adjacent lane to a lane on which the automobile 1 is traveling.

In this case, the surrounding automobile 100 is included in the learning image 34 in an oblique posture to the viewpoint position of the learning image 34. The learning image 34 includes a left side face and the rear face of the surrounding automobile 100. The rear face of the surrounding automobile 100 as an object included in the learning image 34 serves as the confronted face opposed to the viewpoint position of the learning image 34. The left side face of the surrounding automobile 100 serves as an adjacent face to the confronted face. The learning image 34 includes an image region 35 of the rear face and the left side face of the surrounding automobile 100.

Figure 4A:
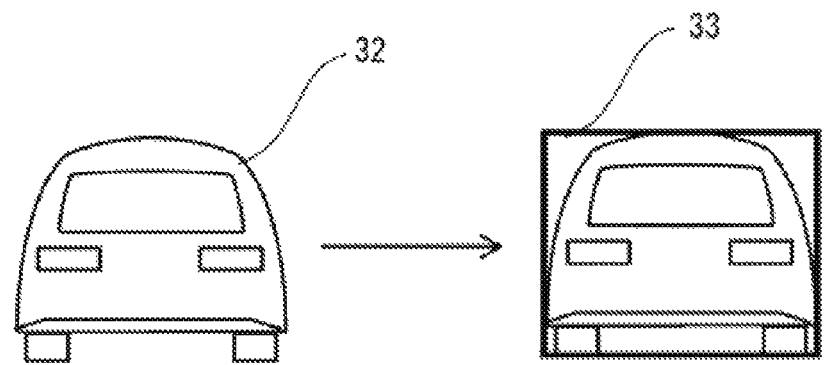
FIGS. 4A and 4B are explanatory diagrams of examples of estimation frames to be learned by the deep learning neural network in FIG. 2B together with the learning images in FIGS. 3A and 3B.
Figure 4B:
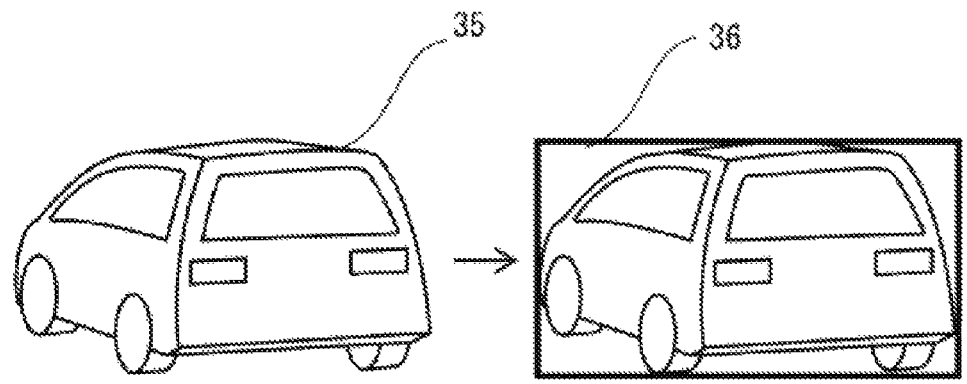

FIGS. 4A and 4B are explanatory diagrams of examples of general estimation frames 33 and 36. The deep learning neural network in FIG. 2B is made to learn the general estimation frames 33 and 36 together with the learning images 31 and 34 in FIGS. 3A and 3B. The estimation frames 33 and 36 are set for the image regions 32 and 35 of the surrounding automobile 100.

In this example, the estimation frames 33 and 36 may indicate the image regions 32 and 35 of the surrounding automobile 100 in the learning images 31 and 34. The estimation frames 33 and 36 may be set as rectangular estimation patterns that enclose the image regions 32 and 35 of the surrounding automobile 100 as an object of the processing. In one embodiment of the disclosure, the estimation frames 33 and 36 may serve as "image region data" indicating the location of the surrounding automobile 100 in the image.

The left part of FIG. 4A illustrates the image region 32 of the rear face of the surrounding automobile 100 included in the learning image 31. In this case, the general estimation frame 33 to be set for the image region 32 of the surrounding automobile 100 is given as a rectangular estimation frame all four sides of which are in contact with an outline of the image region 32 of the surrounding automobile 100, as illustrated in the right part of FIG. 4A. The rectangular estimation frame 33 has all the four sides circumscribed on the image region 32 of the surrounding automobile 100.

The left part of FIG. 4B illustrates the image region 35 of the rear face and the left side face of the surrounding automobile 100 included in the learning image 34. The surrounding automobile 100 is included in the learning image 34 in the oblique posture to the viewpoint position of the learning image 34. In this case, the general estimation frame 36 to be set for the image region 35 of the surrounding automobile 100 is given as a rectangular estimation frame all four sides of which are in contact with an outline of the image region 35 of the surrounding automobile 100, as illustrated in the right part of FIG. 4B. The rectangular estimation frame 36 has all the four sides circumscribed on the image region 35 of the surrounding automobile 100.

In a case where such estimation frames 33 and 36 are learned together with the learning images 31 and 34, the deep learning neural network is supposed to estimate the estimation frame all the four sides of which are in contact with an outline of an image range of the surrounding automobile 100 included in the captured image of the surrounding space, as with FIGS. 4A and 4B, by the estimation processing of the location of the surrounding automobile 100 included in the captured image of the surrounding space.

Figure 5A:
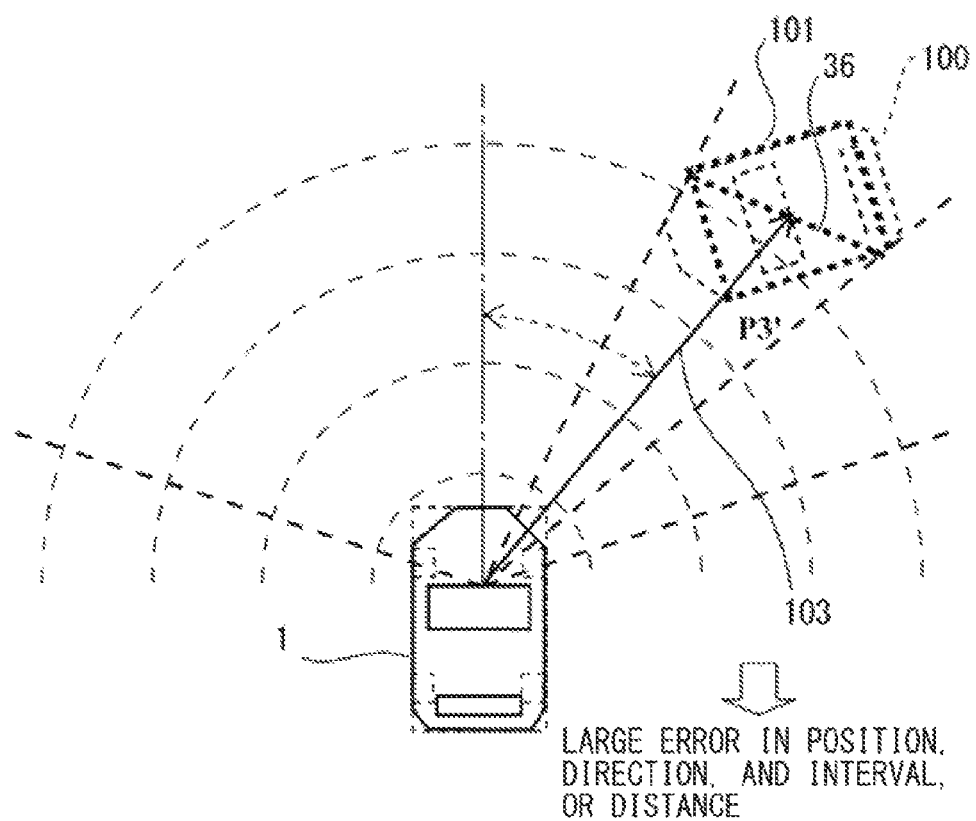
FIGS. 5A and 5B are explanatory diagram of a position, a direction, and an interval, or a distance, relative to an automobile as an own vehicle, of a surrounding automobile as an object.
Figure 5B:
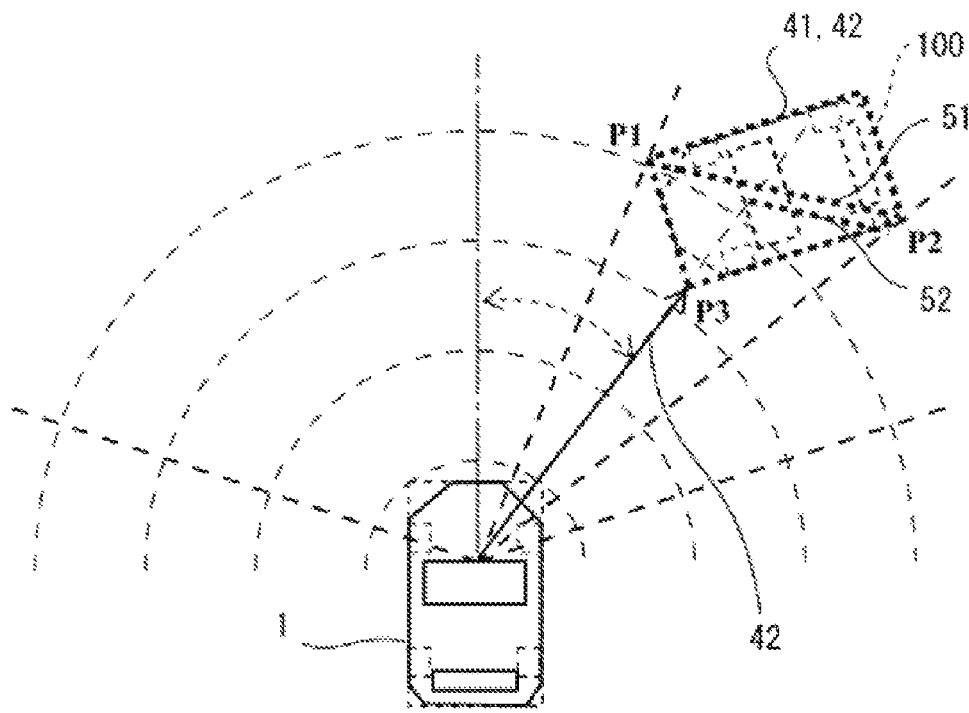

FIGS. 5A and 5B are explanatory diagrams of the position, the direction, and the interval of the surrounding automobile 100 as the object relative to the automobile 1 as the own vehicle.

FIGS. 5A and 5B are schematic views of the automobile 1 as the own vehicle and the surrounding automobile 100, in a plan view from directly above. The automobile 1 is provided with the imaging device 2.

FIGS. 5A and 5B illustrate the surrounding space forward of the automobile 1 in the traveling direction of the automobile 1, with the imaging device 2 as a center. The imaging device 2 is provided in the automobile 1.

Here, the surrounding automobile 100 is present in a right forward direction of the automobile 1 as the own vehicle. In this case, the surrounding automobile 100 appears in the oblique posture in the learning image or in the captured image of the surrounding space by the imaging device 2. A front face of the surrounding automobile 100 in the image serves as the confronted face opposed to the viewpoint position of the image. A left side face of the surrounding automobile 100 serves as the adjacent surface to the confronted face.

FIG. 5A is an explanatory diagram of the relative position, the relative direction, and the relative interval of the surrounding automobile 100 to be estimated with respect to the captured image by the object estimation device 10 in FIGS. 2A and 2B, in a case where the estimation frame 36 in FIG. 4B is learned.

FIG. 5B is an explanatory diagram of the relative position, the relative direction, and the relative interval of the surrounding automobile 100 to be estimated with respect to the captured image by the object estimation device 10 in FIGS. 2A and 2B, in a case where estimation frames 51 and 52 according to this embodiment are learned. The estimation frames 51 and 52 are to be described later.

In the case where the estimation frame 36 in FIG. 4B is learned, the estimation frame for the captured image may be estimated as the estimation frame 36 illustrated in FIG. 5A.

In FIGS. 4A and 4B, the rectangular estimation frames 33 and 36 may be used as teacher data, together with the learning images 31 and 34 in FIGS. 3A and 3B. The rectangular estimation frames 33 and 36 have all four sides circumscribed on the outlines of the image regions 32 and 35 of the surrounding automobile 100. In machine-learning their relevance, the deep learning neural network may learn the rectangular estimation frames 33 and 36 with respect to the learning images 31 and 34. The rectangular estimation frames 33 and 36 have all four sides circumscribed on the outlines of the image regions 32 and 35 of the surrounding automobile 100 included in the learning images 31 and 34.

Thus, the CPU 13 of the object estimation device 10 in FIGS. 2A and 2B is configured to output a rectangular estimation frame, as an estimation frame indicating the location of the surrounding automobile 100 in the captured image by the imaging device 2. As with the estimation frames 33 and 36 in FIGS. 4A and 4B, the rectangular estimation frame has all four sides circumscribed on the outline of the image region of the surrounding automobile 100 included in the captured image by the imaging device 2.

The estimation frame in this case, as illustrated in FIG. 5A, fits inside a range in which the surrounding automobile 100 is actually present. The estimation frame 36 couples together diagonally opposed corners of a two-dimensional frame 101. The two-dimensional frame 101 becomes smaller than the outline of the surrounding automobile 100. The outline of the surrounding automobile 100 includes a right side face, the front face, the left side face, and the rear face. This causes the surrounding automobile 100 present in the real space to protrude forward, rearward, leftward, and rightward from the two-dimensional frame 101. For example, a front portion of the surrounding automobile 100 protrudes forward from the two-dimensional frame 101. The surrounding automobile 100 protrudes ahead of a position of the two-dimensional frame 101 toward the automobile 1 as the own vehicle.

One reason for such relation may be that, for example, the automobile 1 has its four corners, i.e., front-left, front-right, rear-left, and rear-right corners, curved and rounded, causing an actual outline of the automobile 1 to be smaller than the two-dimensional frame 101. The non-cubic shape of the outline of the automobile 1 causes the estimation frame 36 and the two-dimensional frame 101 corresponding to the automobile 1 to be smaller than the outline of the automobile 1.

In a case where a range covered by the estimation frame 36 becomes smaller than the actual outline of the surrounding automobile 100 as a subject, the relative position, the relative direction, the relative interval of the surrounding automobile 100 to be obtained on the basis thereof becomes different from an actual position, an actual direction, and an actual interval of the surrounding automobile 100 with respect to the automobile 1 as the own vehicle, as indicated by a solid arrowed line in the figure. The tip of the solid arrowed line in FIG. 5A is drawn toward a central portion of the estimation frame 36.

In particular, as in FIG. 5A, in a case where the range covered by the estimation frame 36 becomes smaller than the actual outline of the surrounding automobile 100, the estimated interval for the surrounding automobile 100 becomes easily wider than the actual interval.

This results in estimation that the surrounding automobile 100 is present farther away than actual. Even if the travel control of the automobile 1 based on such estimation is performed normally, there is possibility that the automobile 1 as the own vehicle and the surrounding automobile 100 become closer than necessary. While the automobile 1 is executing a normal control to pass near the estimated location of the surrounding automobile 100, possibility may arise that the automobile 1 comes into contact with the surrounding automobile 100 under the normal control.

It is to be noted that a possible alternative may be to obtain the two-dimensional frame 101 from the estimation frame 36 in FIG. 5A, and to obtain a proximity angle P3' of the two-dimensional frame 101. However, because the two-dimensional frame 101 itself is smaller than the actual outline of the surrounding automobile 100, the estimated interval becomes still wider than actual. Accordingly, even if the travel control of the automobile 1 based on the estimated interval is performed normally, possibility may still arise that the automobile 1 as the own vehicle and the surrounding automobile 100 come closer than necessary.

As described, learning the rectangular estimation frames 33 and 36 and making the estimation of the estimation frames on the basis thereof causes the CPU 13 of the object estimation device 10 in FIGS. 2A and 2B to end up estimating the relative position, the relative direction, and the relative interval of the surrounding automobile 100 that include large errors from actual values. The rectangular estimation frames 33 and 36 have all four sides circumscribed on the outlines of the image regions 32 and 35 of the surrounding automobile 100.

Thus, the estimation of the location of the object around the automobile 1 as the own vehicle, e.g., the surrounding automobile 100, has left much to be improved.

Figure 6A:
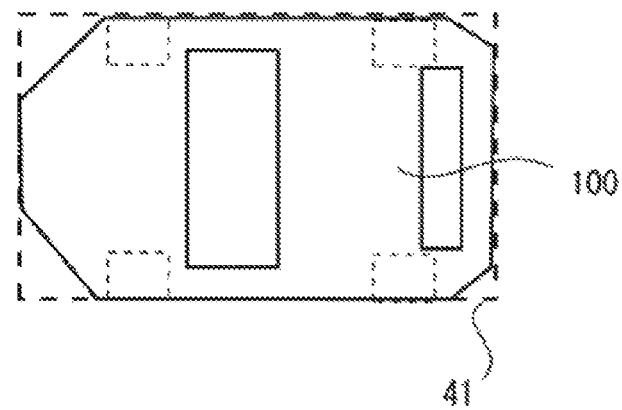
FIG. 6A is an explanatory diagram of a two-dimensional frame circumscribed on the surrounding automobile captured in an oblique posture in FIG. 3B.
Figure 6B:
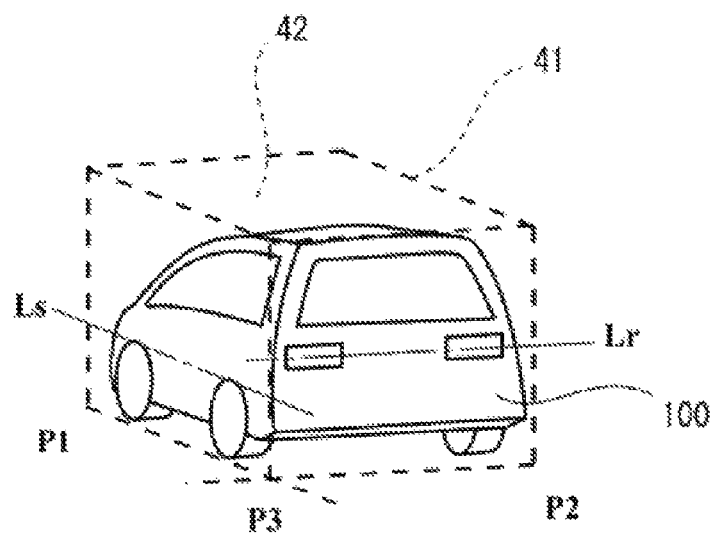
FIG. 6B is an explanatory diagram of a circumscribed cube on the surrounding automobile captured in the oblique posture in FIG. 3B.

FIGS. 6A and 6B are explanatory diagrams of a two-dimensional frame 41 and a circumscribed cube 42. The two-dimensional frame 41 and the circumscribed cube 42 are circumscribed on the surrounding automobile 100 captured in the oblique posture in FIG. 3B.

FIG. 6A is a plan view of the surrounding automobile 100, as viewed from above. The surrounding automobile 100 in FIG. 6A has the outline including four corners, i.e., the front-left, front-right, rear-left, and real-right corners, are curved and rounded.

In this embodiment, the rectangular two-dimensional frame 41 is assumed with respect to the surrounding automobile 100 in FIG. 6A. The rectangular two-dimensional frame 41 encloses the surrounding automobile 100 to include the whole surrounding automobile 100. In this embodiment, the four sides of the two-dimensional frame 41 extending along the front, rear, left, and right sides of the surrounding automobile 100 are circumscribed on respectively corresponding sides of the surrounding automobile 100.

FIG. 6B is a perspective view of the surrounding automobile 100 in FIG. 6A, as viewed obliquely leftward from behind.

FIG. 6B illustrates the circumscribed cube 42 that encloses the whole surrounding automobile 100. Six faces of the circumscribed cube 42 are respectively in contact with top, bottom, left, right, front, and rear faces of the surrounding automobile 100. The top face of the circumscribed cube 42 may be the same as the rectangular two-dimensional frame 41.

The bottom face of the circumscribed cube 42 in FIG. 6B is basically assumed to be a road surface on which the surrounding automobile 100 is traveling. On this assumption, corners P1, P2, and P3 of the bottom face of the circumscribed cube 42 in the figure serve as a plurality of road surface point positions onto which corners of the rectangular two-dimensional frame 41 are mapped.

In this embodiment, the estimation may be made with the use of an estimation frame for machine-learning with reference to the two-dimensional frame 41 or the circumscribed cube 42. The estimation frame indicates the location of the surrounding automobile 100 included in the image. The two-dimensional frame 41 or the circumscribed cube 42 is circumscribed on the surrounding automobile 100 to enclose the surrounding automobile 100.

Moreover, for the estimation frame to be learned, one that is in contact with the road surface or one that is provided upright from the road surface may be used.

Thus, the learned deep learning neural network is expected to be able to estimate the estimation frame with reference to the two-dimensional frame 41 or the circumscribed cube 42, as the image region data indicating the location of the surrounding automobile 100 included in the image. The two-dimensional frame 41 or the circumscribed cube 42 is circumscribed on the surrounding automobile 100 to enclose the surrounding automobile 100.

Furthermore, the learned deep learning neural network is expected to be able to estimate the estimation frame that is in contact with the road surface or the estimation frame that is provided upright from the road surface.

FIGS. 7A to 7D are explanatory diagrams of examples of estimation frames 51 to 54 the relevance of which to the image region 35 of the surrounding automobile 100 captured in the oblique posture in the learning image 34 is to be learned in this embodiment.

The estimation frames 51 to 54 for the learning image 34 are expected to be estimated by the learned deep learning neural network with respect to the captured image by the imaging device 2.

Figure 7A:
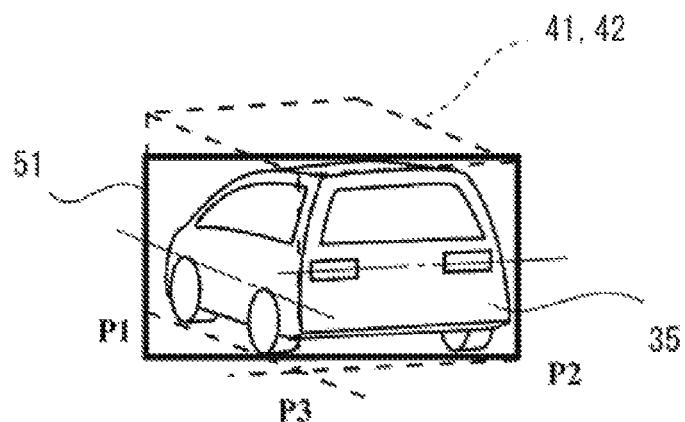
FIGS. 7A to 7D are explanatory diagrams of examples of the estimation frames relevance of which to an image region of the surrounding automobile captured in the oblique posture in the learning image is to be learned in the embodiment.

FIG. 7A is an explanatory view of an example of an overall estimation frame 51. The overall estimation frame 51 encloses entirely the confronted face and the adjacent face of the surrounding automobile 100 captured in the oblique posture.

The overall estimation frame 51 in FIG. 7A may be set to enclose the whole image region 35 including the confronted face and the adjacent face of the surrounding automobile 100.

A left side of the overall estimation frame 51 basically extends along a vertical direction of a screen in the learning image 34. Note that the learning image 34 also serves as the captured image, and the same applies to the following description. The left side of the overall estimation frame 51 overlaps a front-left vertical edge of the circumscribed cube 42 in the learning image 34, as viewed from the viewpoint position of the learning image 34. The left side of the overall estimation frame 51 is apart from the image region 35 of the surrounding automobile 100. The left side of the overall estimation frame 51 passes through the road surface point position P1 in the learning image 34. The road surface point position P1 is one of the corners of the bottom surface on the front-left vertical edge of the circumscribed cube 42.

A right side of the overall estimation frame 51 basically extends along the vertical direction of the screen in the learning image 34. The right side of the overall estimation frame 51 overlaps a rear-right vertical edge of the circumscribed cube 42 in the learning image 34, as viewed from the viewpoint position of the learning image 34. The right side of the overall estimation frame 51 is apart from the image region 35 of the surrounding automobile 100. A lower end of the right side of the overall estimation frame 51 is superposed on the road surface point position P2 in the learning image 34. The road surface point position P2 is one of the corners of the bottom surface on the rear-right vertical edge of the circumscribed cube 42.

An upper side and a lower side of the overall estimation frame 51 basically extend in a lateral direction of the screen in the learning image 34. The upper side and the lower side couple together the left side and the right side.

Thus, the rectangular overall estimation frame 51 is set for the learning image 34 to enclose the image region 35 and to include the whole image region 35. The image region 35 includes the confronted face and the adjacent face of the surrounding automobile 100.

The overall estimation frame 51 is provided upright with reference to the rectangular two-dimensional frame 41, taking a posture to couple together diagonally opposed corners of the two-dimensional frame 41. The two-dimensional frame 41 encloses the surrounding automobile 100 along the front, rear, left, and right sides of the surrounding automobile 100, in a plan view of the surrounding automobile 100 included in the learning image 34.

A lower right corner in the figure of the overall estimation frame 51 is superposed on the road surface point position P2, and is in contact with the road surface around the surrounding automobile 100 included in the learning image 34.

Figure 7B:
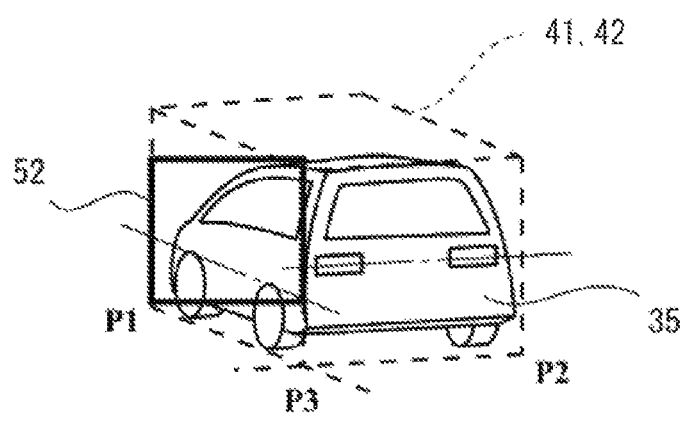

FIG. 7B is an explanatory view of an example of a first adjacent estimation frame 52. The first adjacent estimation frame 52 encloses the adjacent face of the surrounding automobile 100 captured in the oblique posture.

The first adjacent estimation frame 52 in FIG. 7B is set to overlap the image region of the adjacent face of the surrounding automobile 100.

A left side of the first adjacent estimation frame 52 extends along the vertical direction of the screen in the learning image 34. The left side of the first adjacent estimation frame 52 overlaps the front-left vertical edge of the circumscribed cube 42 in the learning image 34, as viewed from the viewpoint position of the learning image 34. The left side of the first adjacent estimation frame 52 is apart from the image region 35 of the surrounding automobile 100. A lower end of the left side of the first adjacent estimation frame 52 is superposed on the road surface point position P1 in the learning image 34. The road surface point position P1 is one of the corners of the bottom face on the front-left vertical edge of the circumscribed cube 42.

A right side of the first adjacent estimation frame 52 extends along the vertical direction of the screen in the learning image 34. The right side of the first adjacent estimation frame 52 overlaps the rear-left vertical edge of the circumscribed cube 42 in the learning image 34, as viewed from the viewpoint position of the learning image 34. Below the right side of the first adjacent estimation frame 52 in the learning image 34, the road surface point position P3 is located. The road surface point position P3 is one of the corners of the bottom face on the rear-left vertical edge of the circumscribed cube 42.

An upper side and a lower side of the first adjacent estimation frame 52 basically extend in the lateral direction of the screen in the learning image 34. The upper side and the lower side couple together the left side and the right side.

Thus, the first adjacent estimation frame 52 of a rectangular shape is set with respect to the learning image 34 to overlap the image region of the adjacent surface of the surrounding automobile 100.

The first adjacent estimation frame 52 is provided upright, with reference to the rectangular two-dimensional frame 41, following a left edge in the figure of the two-dimensional frame 41. The two-dimensional frame 41 encloses the surrounding automobile 100 along the front, rear, left, and right sides of the surrounding automobile 100, in the plan view of the surrounding automobile 100 included in the learning image 34.

Moreover, a lower left corner in the figure of the first adjacent estimation frame 52 is superposed on the road surface point position P1, and is in contact with the road surface around the surrounding automobile 100 included in the learning image 34.

Figure 7C:
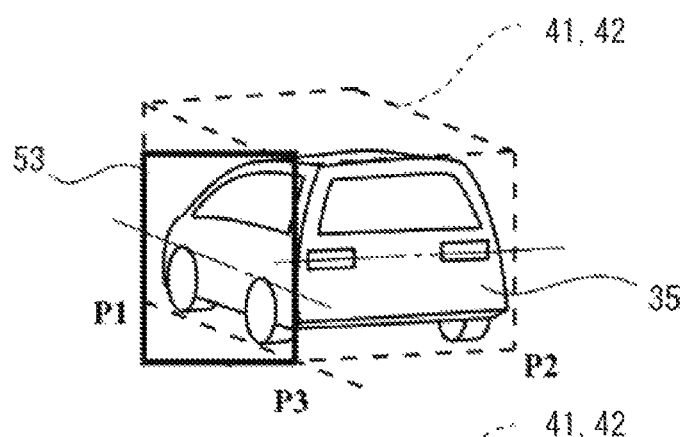

FIG. 7C is an explanatory view of an example of a second adjacent estimation frame 53. The second estimation frame 53 encloses the adjacent face of the surrounding automobile 100 captured in the oblique posture.

The second adjacent estimation frame 53 in FIG. 7C is set to overlap the image region of the adjacent face of the surrounding automobile 100.

A left side of the second adjacent estimation frame 53 extends along the vertical direction of the screen in the learning image 34. The left side of the second adjacent estimation frame 53 overlaps the front-left vertical edge of the circumscribed cube 42 in the learning image 34, as viewed from the viewpoint position of the learning image 34. The left side of the second adjacent estimation frame 53 is apart from the image region 35 of the surrounding automobile 100. The left side of the second adjacent estimation frame 53 passes through the road surface point position P1 in the learning image 34. The road surface point position P1 is one of the corners of the bottom face on the front-left vertical edge of the circumscribed cube 42.

A right side of the second adjacent estimation frame 53 extends along the vertical direction of the screen in the learning image 34. The right side of the second adjacent estimation frame 53 overlaps the rear-left vertical edge of the circumscribed cube 42 in the learning image 34, as viewed from the viewpoint position of the learning image 34. A lower end of the right side of the second adjacent estimation frame 53 is superposed on the road surface point position P3 in the learning image 34. The road surface point position P3 is one of the corners of the bottom face on the rear-left vertical edge of the circumscribed cube 42.

An upper side and a lower side of the second adjacent estimation frame 53 basically extend along the lateral direction of the screen in the learning image 34. The upper side and the lower side couple together the left side and the right side.

Thus, the second adjacent estimation frame 53 of a rectangular shape is set with respect to the learning image 34 to overlap the image region of the adjacent face of the surrounding automobile 100.

The second adjacent estimation frame 53 is provided upright, with reference to the rectangular two-dimensional frame 41, following the left side in the figure of the two-dimensional frame 41. The two-dimensional frame 41 encloses the surrounding automobile 100 along the front, rear, left, and right side faces of the surrounding automobile 100, in the plan view of the surrounding automobile 100 included in the learning image 34.

Moreover, a lower right corner in the figure of the second adjacent estimation frame 53 is superposed on the road surface point position P3, and is in contact with the road surface around the surrounding automobile 100 included in the learning image 34.

Figure 7D:
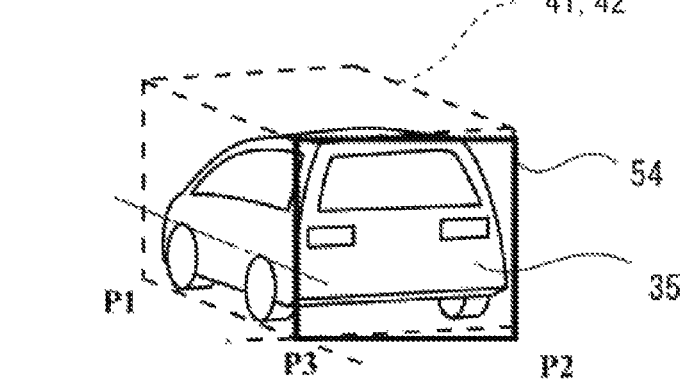

FIG. 7D is an explanatory view of an example of a confronted estimation frame 54. The confronted estimation frame 54 encloses the confronted face of the surrounding automobile 100 captured in the oblique posture.

The confronted estimation frame 54 in FIG. 7D is set to overlap the image region of the confronted face of the surrounding automobile 100.

A left side of the confronted estimation frame 54 extends along the vertical direction of the screen in the learning image 34. The left side of the confronted estimation frame 54 overlaps the rear-left vertical edge of the circumscribed cube 42 in the learning image 34, as viewed from the viewpoint position of the learning image 34. A lower end of the left side of the confronted estimation frame 54 is superposed on the road surface point position P3 in the learning image 34. The road surface point position P3 is one of the corners of the bottom face on the rear-left vertical edge of the circumscribed cube 42.

A right side of the confronted estimation frame 54 extends along the vertical direction of the screen in the learning image 34. The right side of the confronted estimation frame 54 overlaps the rear-right vertical edge of the circumscribed cube 42 in the learning image 34, as viewed from the viewpoint position of the learning image 34. The right side of the confronted estimation frame 54 is apart from the image region 35 of the surrounding automobile 100. The right side of the confronted estimation frame 54 in the learning image 34 passes through the road surface point position P2. The road surface point position P2 is one of the corners of the bottom face on the rear-right vertical edge of the circumscribed cube 42.

An upper side and a lower side of the confronted estimation frame 54 basically extend along the lateral direction of the screen in the learning image 34. The upper side and the lower side couple together the left side and the right side.

Thus, the confronted estimation frame 54 of a rectangular shape is set for the learning image 34 to overlap the image region of the confronted face of the surrounding automobile 100.

The confronted estimation frame 54 is provided upright, with reference to the rectangular two-dimensional frame 41, following a confronted edge below in the figure of the two-dimensional frame 41. The two-dimensional frame 41 encloses the surrounding automobile 100 along the front, rear, left, and right side faces of the surrounding automobile 100, in the plan view of the surrounding automobile 100 included in the learning image 34.

Moreover, a lower left corner in the figure of the confronted estimation frame 54 is superposed on the road surface point position P3, and is in contact with the road surface around the surrounding automobile 100 included in the learning image 34.

The estimation frames 51 to 54 to be learned in association with the learning image 34 are widened from the image region 35 of the surrounding automobile 100 included in the learning image 34.

The widened estimation frames 51 to 54 may be learned in association with the learning image 34, at least in a case where the surrounding automobile 100 is included in the learning image 34 in the oblique posture to the viewpoint position of the learning image 34. The surrounding automobile 100 serves as the object included in the learning image 34. In an alternative, the widened estimation frames 51 to 54 may also be learned in association with the learning image 31, in a case where the surrounding automobile 100 included in the learning image 31 is included in the learning image 31 in a confronted posture to the viewpoint position of the learning image 31.

After such learning, the learned depth learning neural network may estimate the widened estimation frames 51 to 54, as the image region data. The widened estimation frames 51 to 54 overlap the image region of the surrounding automobile 100 in the captured image. The image region data indicates the location of the surrounding automobile 100 as the object in the captured image by the imaging device 2. In a case with the use of, for example, the overall estimation frame 51 in FIG. 7A and the first adjacent estimation frame 52 in FIG. 7B as teacher data together with the learning image 34 in FIG. 3B, to machine-learn their relevance, the CPU 13 of the object estimation device 10 in FIGS. 2A and 2B estimates the overall estimation frame 51 and the first adjacent estimation frame 52 with respect to the captured image by the imaging device 2. The CPU 13 of the object estimation device 10 performs the estimation based on the learned model. The overall estimation frame 51 and the first adjacent estimation frame 52 each have four sides a portion or all of which is apart from the outline of the image region of the surrounding automobile 100 included in the oblique posture in the captured image by the imaging device 2. The CPU 13 of the object estimation device 10 in FIGS. 2A and 2B is configured to estimate the overall estimation frame 51 and the first adjacent estimation frame 52, as the image region data for the surrounding automobile 100 included in the oblique posture in the captured image. The image region data indicates the location of the object in the captured image. The overall estimation frame 51 and the first adjacent estimation frame 52 each have four sides a portion or all of which is apart from the outline of the image region of the surrounding automobile 100 included in the captured image by the imaging device 2.

The widened estimation frame thus estimated for the captured image has four sides a portion or all of which is apart from the image region of the surrounding automobile 100 included in the oblique posture in the captured image, as with the case of FIGS. 7A to 7D. In the case where the surrounding automobile 100 included in the captured image is included in the oblique posture to the viewpoint position of the captured image, the widened estimation frame has the four sides a portion or all of which is apart from the image region of the surrounding automobile 100, differently from, for example, the general estimation frame 33 in FIG. 4A in the case where the surrounding automobile 100 is included in the captured image in the confronted posture to the viewpoint position of the captured image.

Moreover, the estimation may be made that the widened estimation frame estimated is in contact with the road surface included in the captured image, or that the widened estimation frame estimated is provided upright from the road surface included in the captured image.

It is to be noted that the estimation frames to be learned in this embodiment or the estimation frames to be estimated in this embodiment are not limited to the estimation frames 51 to 54 illustrated in FIGS. 7A to 7D. It suffices that the estimation frame to be learned or the estimation frame to be estimated is provided upright with reference to at least the rectangular two-dimensional frame 41. The rectangular two-dimensional frame 41 encloses the surrounding automobile 100 as the object along the front, rear, left, and right sides of the surrounding automobile 100.

Moreover, in one example, the estimation frame to be learned in this embodiment or the estimation frame to be estimated in this embodiment may be one that is in contact with the road surface included in the captured image, or one that is provided upright from the road surface included in the captured image, as with those in FIGS. 7A to 7D. At this occasion, the estimation frame to be learned or the estimation frame to be estimated may be in contact with the road surface or provided upright from the road surface at a different road surface point position from FIGS. 7A to 7D.

In this embodiment, for example, at least two estimation frames out of the four estimation frames 51 to 54 illustrated in FIGS. 7A to 7D may be machine-learned together with the captured image. The plurality of the estimation frames to be learned is different from one another in position and width in the image. In the following, description is made by giving an example of the learned deep learning neural network that has learned the overall estimation frame 51 in FIG. 7A and the first adjacent estimation frame 52 in FIG. 7B.

It is to be noted that the estimation frame to be used in the learning of the deep learning neural network may be given with reference to a two-dimensional frame of a larger size than the two-dimensional frame 41 illustrated in FIGS. 6A and 6B, and 7A to 7D. As a reference two-dimensional frame becomes larger, the estimation frame also becomes larger and more widened. It follows therefore that the estimation frame is set to be apart outward from the actual position of the surrounding automobile 100 as the subject. The interval from the automobile 1 as the own vehicle to the surrounding automobile 100 to be generated on the basis of the larger estimation frame becomes smaller than that to be generated on the basis of a small estimation frame. As a result, in controlling the travel of the automobile 1 on the basis of the estimation frame, the travel of the automobile 1 may be possibly controlled to bring the automobile 1 farther away from the surrounding automobile 100. This makes it difficult for the automobile 1 as the own vehicle to perform the travel control to bring the automobile 1 closer to the surrounding automobile 100. Enlarging the estimation frame makes it possible to provide a larger safety margin in the travel control. However, enlarging the two-dimensional frame 41 too much involves estimating the surrounding automobile 100 of a larger size than actual. This causes difficulty in making the travel control to keep the automobile 1 from coming too close to the surrounding automobile 100, resulting in increasing possibility that the travel control itself becomes unavailable. The size of the two-dimensional frame 41 may be decided, in consideration of continuity of the travel control of the automobile 1, in accordance with specifications for, for example, safety of the travel control.

Figure 8:
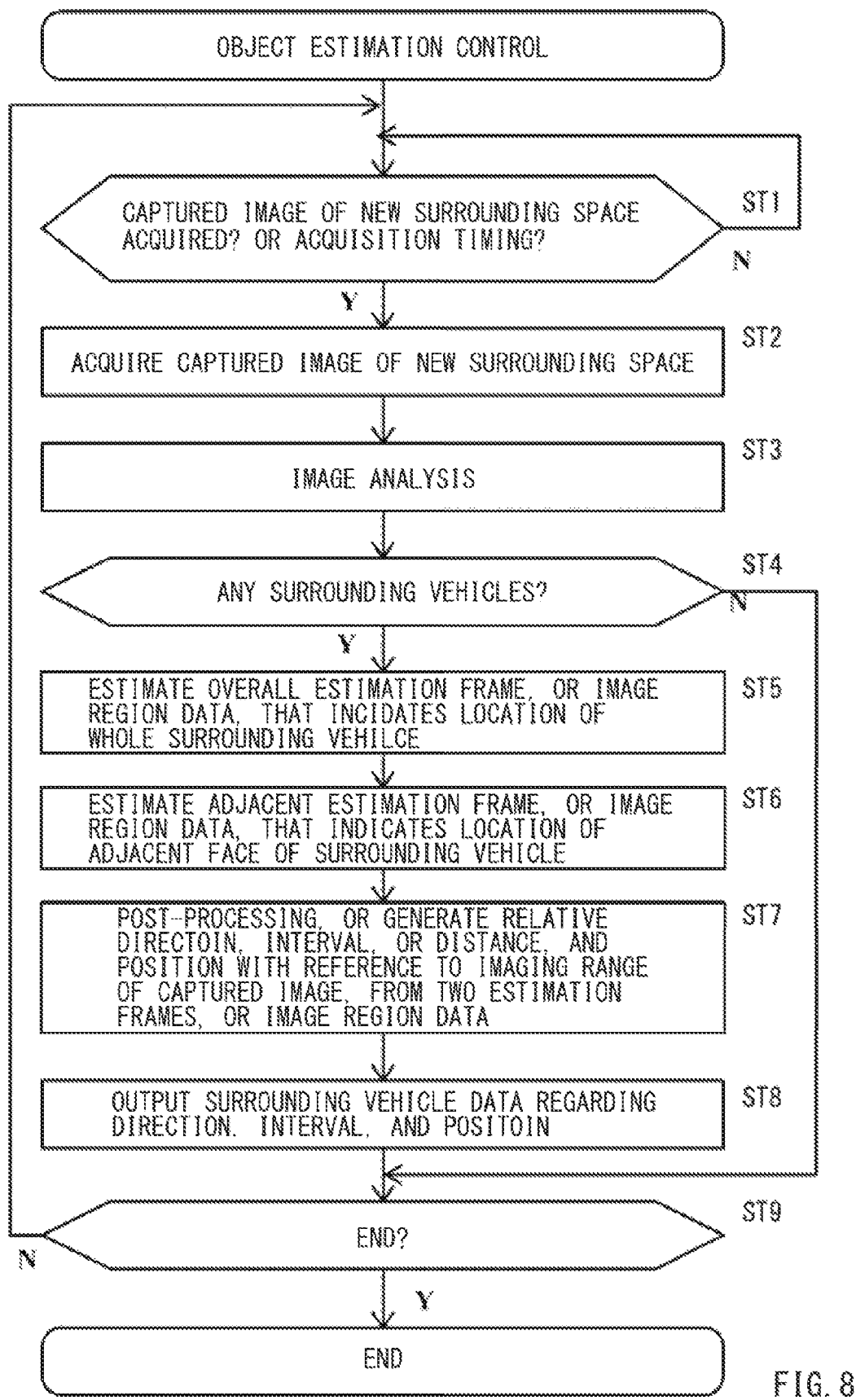
FIG. 8 is a flowchart of an object estimation control by the object estimation device in FIGS. 2A and 2B.

FIG. 8 is a flowchart of an object estimation control by the object estimation device 10 in FIGS. 2A and 2B.

The CPU 13 of the object estimation device 10 in FIGS. 2A and 2B may learn the relevance as mentioned above between the learning image, and the overall estimation frame 51 and the first adjacent estimation frame 52.

For example, the CPU 13 of the object estimation device 10 in FIGS. 2A and 2B may repeatedly perform the object estimation control in FIG. 8 for the travel of the automobile 1, using the learned deep learning neural network.

Data regarding the learned model obtained by learning the relevance as mentioned above between the learning image, and the overall estimation frame 51 and the first adjacent estimation frame 52 may be held in the memory 12 as a portion of the data regarding the deep learning neural network.

In the following, description is made by giving an example of the surrounding automobile 100 present around the automobile 1 as the own vehicle provided with the imaging device 2, as the object with respect to the captured image in the estimation control in FIG. 8.

In step ST1, the CPU 13 of the object estimation device 10 may determine whether or not to acquire the captured image of the new surrounding space by the imaging device 2. In a case where the captured image of the new surrounding space has been acquired from the imaging device 2, or in a case where it is timing to acquire the captured image of the new surrounding space from the imaging device 2 (Y in step ST1), the CPU 13 may determine that the captured image of the new surrounding space by the imaging device 2 is to be acquired, and cause the flow to proceed to step ST2. In a case where the captured image of the new surrounding space by the imaging device 2 is not to be acquired (N in step ST2), the CPU 13 may repeat this process.

In step ST2, the CPU 13 may acquire the captured image of the new surrounding space by the imaging device 2. The CPU 13, as the acquisition unit, is configured to acquire the captured image of the surrounding space including the nearby surrounding automobile 100. The surrounding automobile 100 is a real object present in the real space.

In step ST3 and subsequent steps, the CPU 13 may analyze the newly acquired captured image, to analyze the nearby surrounding automobile 100 as the object included in the captured image.

In step ST4, the CPU 13 may determine whether or not the nearby surrounding automobile 100 is included in the newly acquired captured image. In a case with no nearby surrounding automobile 100 included in the captured image (N in step ST4), the CPU 13 may skip processes of steps ST5 to ST8, causing the flow to proceed to step ST9. In a case where the nearby surrounding automobile 100 is included in the captured image (Y in step ST4), the CPU 13 may cause the flow to proceed to step ST5.

In step ST5, the CPU 13 may estimate the overall estimation frame 51 of the rectangular shape, with respect to the nearby surrounding automobile 100 included in the newly acquired captured image of the surrounding space, with the use of the learned deep learning neural network. The overall estimation frame 51 serves as the image region data indicating the location of an entirety of the nearby surrounding automobile 100 in the image.

For example, in a case where the nearby surrounding automobile 100 included in the captured image of the surrounding space is included in the captured image in the confronted posture to the viewpoint position of the captured image, the CPU 13 may estimate the overall estimation frame 51 of the rectangular shape. The overall estimation frame 51 is in contact with the outline of the image region of the nearby surrounding automobile 100 in the confronted posture in the captured image. All the four sides of the overall estimation frame 51 of the rectangular shape are in contact with the outline of the image region of the nearby surrounding automobile 100 in the captured image.

In addition, for example, in a case where the nearby surrounding automobile 100 included in the captured image of the surrounding space is included in the captured image in the oblique posture to the viewpoint position of the captured image, the CPU 13 may estimate the overall estimation frame 51 widened from the image region of the nearby surrounding automobile 100 in the oblique posture in the captured image. At least the left and right sides out of the four sides of the overall estimation frame 51 of the rectangular shape are apart from the outline of the image region of the nearby surrounding automobile 100 in the captured image.

As described, in the case where the nearby surrounding automobile 100 included in the captured image is included in the captured image in the oblique posture to the viewpoint position of the captured image, the CPU 13 may estimate the estimation frame of the rectangular shape a portion or all of the four sides of which is apart from the image region of the nearby surrounding automobile 100, differently from the case where the nearby surrounding automobile 100 included in the captured image is included in the captured image in the confronted posture to the viewpoint position of the captured image.

In step ST6, the CPU 13 may estimate the first adjacent estimation frame 52 of the rectangular shape with respect to the nearby surrounding automobile 100 included in the newly acquired captured image of the surrounding space, with the use of the learned deep learning neural network. The first adjacent estimation frame 52 serves as the image region data indicating the location of the adjacent face of the nearby surrounding automobile 100 in the image.

For example, in a case where the nearby surrounding automobile 100 included in the captured image of the surrounding space is included in the captured image in the oblique posture to the viewpoint position of the captured image, the CPU 13 may estimate the first adjacent estimation frame 52 widened to be apart from the image region of the adjacent face of the nearby surrounding automobile 100 in the oblique posture in the captured image. At least the left side or right side out of the four sides of the first adjacent estimation frame 52 of the rectangular shape is apart leftward or rightward from the outline of the image region of the adjacent face of the nearby surrounding automobile 100 in the captured image.

Moreover, in a case where the nearby surrounding automobile 100 included in the captured image of the surrounding space is included in the captured image in the confronted posture to the viewpoint position of the captured image, the CPU 13 may estimate the confronted estimation frame 54 of the rectangular shape instead of the first adjacent estimation frame 52 of the rectangular shape. The CPU 13 may be configured to estimate neither the first adjacent estimation frame 52 of the rectangular shape nor the confronted estimation frame 54 of the rectangular shape.

In step ST7, the CPU 13 may start post-processing of the estimation processing of the estimation frames by the deep learning neural network. The CPU 13 may generate, from the estimated two estimation frames, the position, the direction, and the interval of the nearby surrounding automobile 100 relative to the imaging device 2 of the automobile 1 as the own vehicle, with reference to the imaging range of the captured image.

For example, in the case where the nearby surrounding automobile 100 included in the captured image of the surrounding space is included in the captured image in the oblique posture to the viewpoint position of the captured image, the CPU 13 may identify the position and the posture of the nearby surrounding automobile 100 with the use of both the overall estimation frame 51 and the first adjacent estimation frame 52 estimated for the nearby surrounding automobile 100 in the oblique posture in the captured image. On the basis of the position and the posture of the nearby surrounding automobile 100 identified, the CPU 13 may generate the relative position, the relative direction, and the relative interval of the nearby surrounding automobile 100.

In addition, for example, in the case where the nearby surrounding automobile 100 included in the captured image of the surrounding space is included in the captured image in the confronted posture to the viewpoint position of the captured image, the CPU 13 may identify the position and the posture of the nearby surrounding automobile 100 with the use of the overall estimation frame 51 out of the overall estimation frame 51 and the first adjacent estimation frame 52. On the basis of the position and the posture of the nearby surrounding automobile 100 identified, the CPU 13 may generate the relative position, the relative direction, and the relative interval of the nearby surrounding automobile 100. At this occasion, the CPU 13 may generate the relative position, the relative direction, and the relative interval of the nearby surrounding automobile 100, assuming that a midpoint of a lower side of the overall estimation frame 51 of the rectangular shape is the position of the nearby surrounding automobile 100.

In step ST8, the CPU 13 may output the relative position, the relative direction, and the relative interval generated of the nearby surrounding automobile 100, as the surrounding vehicle data. The surrounding vehicle data may be outputted to the travel control processor 4 through the input and output ports 11.

The travel control processor 4 may control the travel of the own vehicle with the use of the surrounding vehicle data generated by the object estimation device 10. The travel control processor 4 may determine a course or a travelable range away from the nearby surrounding automobile 100 to keep the automobile 1 from coming into contact with the nearby surrounding automobile 100, to control the travel of the automobile 1.

In step ST9, the CPU 13 may determine whether or not to end the object estimation control. For example, in a case where movement, or the travel, of the automobile 1 as the own vehicle has ended, the CPU 13 may determine that the object estimation control is to be ended (Y in step ST9), and end the control. In a case where the CPU 13 does not determine that the object estimation control is to be ended (N in step ST9), the CPU 13 may cause the flow to return to step ST1. The CPU 13 may acquire the next captured image and repeat the processes of steps ST1 to ST9.

Figure 9:
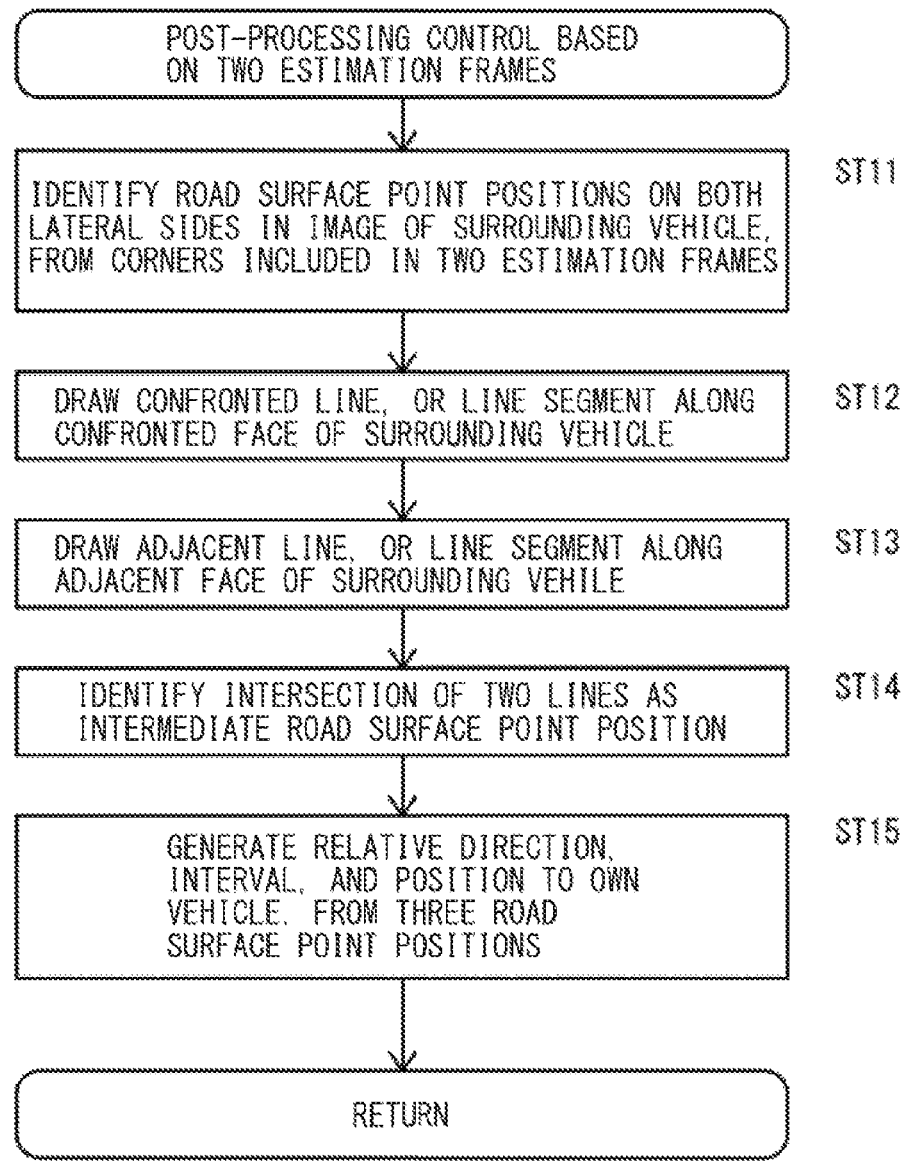
FIG. 9 is a flowchart of a post-processing control based on two estimation frames.

FIG. 9 is a flowchart of a post-processing control based on two estimation frames.

In the case where the nearby surrounding automobile 100 included in the captured image of the surrounding space is included in the captured image in the oblique posture to the viewpoint position of the captured image, the CPU 13 of the object estimation device 10 in FIGS. 2A and 2B may execute, in step ST7 in FIG. 8, the post-processing control based on the two estimation frames in FIG. 9.

Under this situation, the automobile 1 as the own vehicle, the nearby surrounding automobile 100, the two-dimensional frame, the circumscribed cube, the overall estimation frame, the first adjacent estimation frame 52, and the plurality of the road surface point positions P1 to P3 are in the positional relation illustrated in, for example, FIG. 5B in the surrounding space. In the surrounding space in FIG. 5B, the overall estimation frame protrudes front-rightward from the front-right of the nearby surrounding automobile 100, and protrudes rear-leftward from the rear-left of the nearby surrounding automobile 100. The first adjacent estimation frame 52 protrudes rear-leftward from the rear-left of the nearby surrounding automobile 100.

FIG. 5B is an explanatory diagram of the relative position, the relative direction, and the relative interval of the surrounding automobile 100 to be estimated by the object estimation device 10 in FIGS. 2A and 2B in the case where the estimation frames of this embodiment have been learned.

In step ST11, the CPU 13 may identify the road surface point positions P1 and P2 on both lateral sides in the image of the nearby surrounding automobile 100 from the corners included in the two estimation frames, i.e., the overall estimation frame and the first adjacent estimation frame 52. In the case of FIG. 5B, for example, the CPU 13 may identify the lower right corner of the overall estimation frame as the road surface point position P2 on the right in the image of the nearby surrounding automobile 100, and identify the lower left corner of the first adjacent estimation frame 52 as the road surface point position P1 on the left in the image of the nearby surrounding automobile 100. The corners to be extracted as the road surface point positions from the plurality of the estimation frames vary with, for example, a combination of the plurality of the estimation frames, and association of the estimation frames with the road surface point positions to be included in each of the estimation frames as the corner.

The CPU 13 may set the road surface point positions P1 and P2 identified, in the surrounding space as illustrated in FIG. 5B.

In step ST12, the CPU 13 may draw a line segment along the confronted face of the nearby surrounding automobile 100 in the surrounding space in which the road surface point positions P1 and P2 are set. For example, as illustrated in FIG. 6B, the CPU 13 may identify and extract a pair of taillights from the captured image of the nearby surrounding automobile 100. The pair of the taillights are present at both lateral ends of the rear face of the nearby surrounding automobile 100. The rear face of the nearby surrounding automobile 100 may serve as the confronted face. The CPU 13 may draw a confronted line from the road surface point position P2. The confronted line is parallel to the line segment coupling together the pair of taillights. The road surface point position P2 is located on the opposite side to the adjacent face with reference to the confronted face.

In step ST13, the CPU 13 may draw a line segment along the adjacent face of the nearby surrounding automobile 100 in the surrounding space in which the road surface point positions P1 and P2 are set. For example, as illustrated in FIG. 6B, the CPU 13 may identify and extract a pair of wheels from the captured image of the nearby surrounding automobile 100. The pair of the wheels are arranged longitudinally on the left side face of the nearby surrounding automobile 100. The left side face of the nearby surrounding automobile 100 may serve as the adjacent face. The CPU 13 may draw an adjacent line from the road surface point position P1. The adjacent line is parallel to the line segment coupling together the centers of the pair of the wheels. The road surface point position P1 is located on the side on which the adjacent face is disposed.

In step ST14, the CPU 13 may identify an intersection of the confronted line drawn in step ST12 and the adjacent line drawn in step ST13 as the intermediate road surface point position P3. The CPU 13 may identify the intermediate road surface point position P3 in the surrounding space in which the confronted line and the adjacent line are drawn. In this way, it is possible for the CPU 13 to identify the three road surface point positions P1 to P3 with respect to the imaging device 2 of the automobile 1 as the own vehicle, in the surrounding space as illustrated in FIG. 5B.

In step ST15, the CPU 13 may calculate and generate the position, the direction, and the interval of the nearby surrounding automobile 100 relative to the own vehicle, with the use of the three road surface point positions P1 to P3 identified. The CPU 13 may generate the position, the direction, and the interval of the nearby surrounding automobile 100 relative to the own vehicle, on the basis of the relative relation between the identified intermediate road surface point position P3 and the position of the automobile 1 as the own vehicle, in the surrounding space as in FIG. 5B.

It is to be noted that the captured image of the surrounding space may be, for example, the learning image illustrated in FIG. 3B. In a case where an imaging range, or an angle of view, of the imaging device 2 is fixed to, for example, the state of FIG. 5B, the position, the direction, and the interval relative to the own vehicle of each pixel of the captured image of the surrounding space including only a flat road surface as an image component are also considered to become fixed. With the use of such data regarding the relative position, the relative direction, and the relative interval for each pixel, the CPU 13 may identify a pixel capturing, for example, the intermediate road surface point position P3. The CPU 13 may set the position, the direction, and the interval associated with the identified pixel, as the position, the direction, and the interval of the intermediate road surface point position P3. In this case, the CPU 13 may generate the position, the direction, and the interval associated with the identified pixel as the position, the direction, and the interval relative to the own vehicle of the nearby surrounding automobile 100. The data regarding the relative position, the relative direction, and the relative interval for each pixel may be held in, for example, the memory 12.

With such processing, it is possible for the CPU 13 to generate the direction, the interval, or the position of the surrounding automobile 100 relative to the viewpoint position of the imaging device 2, with the use of the plurality of the estimation frames as the image region data estimated. The surrounding automobile 100 may serve as the nearby surrounding automobile 100 present in the surrounding space. In one embodiment of the disclosure, the CPU 13 may serve as a "post-processing unit".

In the case where the nearby surrounding automobile 100 included in the captured image is included in the captured image in the oblique posture to the viewpoint position of the captured image, it is possible for the CPU 13 to generate, with high accuracy, the direction, the interval, or the position of the surrounding automobile 100 included in the oblique posture relative to the viewpoint position of the imaging device 2, with the use of the two estimation frames, e.g., the overall estimation frame 51 and the adjacent estimation frame 52 for the surrounding automobile 100 included in the oblique posture.

As described above, in this embodiment, the widened estimation frame is estimated on the basis of the captured image of the surrounding space including the nearby surrounding automobile 100 as the object. The widened estimation frame serves as the image region data indicating the location of the nearby surrounding automobile 100 in the captured image of the surrounding space. In this embodiment, in the case where the nearby surrounding automobile 100 included in the captured image of the surrounding space is included in the captured image in the oblique posture to the viewpoint position of the captured image of the surrounding space, the image region widened from the image region of the nearby surrounding automobile 100 in the oblique posture in the captured image is set as the widened estimation frame. The widened estimation frame indicates the location of the nearby surrounding automobile 100 in the captured image of the surrounding space.

Thus, in this embodiment, it is possible to obtain the location of the nearby surrounding automobile 100 that has come close to the viewpoint position of the captured image, on the basis of the widened estimation frame for the nearby surrounding automobile 100 in the oblique posture in the captured image of the surrounding space, differently from, for example, the estimation frame having the four sides all of which are in contact with the image region of the object.

Hence, in this embodiment, it is possible to improve the estimation of the location of the nearby surrounding automobile 100.

In particular, in this embodiment, allowing the deep learning neural network to learn the widened estimation frame for the estimation saves separately performing, after estimating the estimation frame, on the basis of the estimation frame, a process of determining the confronted face or the adjacent face of the surrounding automobile 100, and a process of obtaining the position of the road surface corresponding to the estimation frame. The estimation frame itself includes, with a certain degree of certainty, data regarding the confronted face and the adjacent face of the surrounding automobile 100, and the data regarding the road surface point positions. This allows the post-processing based on the estimation frame to be simple and lightly loaded. In this embodiment, the use of these pieces of data already included in the estimation frames makes it possible to obtain the relative position, the relative direction, and the relative interval of the nearby surrounding automobile 100 by the simple post-processing. It is possible to allow the processing by the object estimation device 10 including the post-processing to be short-time and lightly loaded to obtain real-time performance desired in the travel control of the automobile 1.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

In the forgoing example embodiments, the object estimation device 10 may have the nearby surrounding automobile 100 as the object of the estimation processing by the object estimation device 10. The surrounding automobile 100 is present around the automobile 1 as the own vehicle.

In addition, the object estimation device 10 may have, for example, a human, a bicycle, a train, an aircraft, playground equipment such as a ball, a movable falling object such as a corrugated fiberboard box, and/or a fixed object such as a building, as the object of the estimation processing by the object estimation device 10. Applying the estimation processing described above to these material objects makes it possible to obtain highly accurately the position, the direction, and the interval of the object relative to the automobile 1 as the own vehicle.

In the forgoing example embodiments, the object estimation device 10 has material objects present in the real space as the object of the estimation processing.

In addition, the object estimation device 10 may have an object considered to be present in a virtual space or an object considered to be present in a mixed space of a virtual space and the real space as the object of the estimation processing.

In the forgoing example embodiments, the object estimation device 10 may learn, for example, the captured image of the surrounding space by the imaging device 2, for use in the estimation processing.

The object estimation device 10 may learn the space image regarding the surrounding space for the use in the estimation processing. The space image is generated by another detection device provided in the automobile 1. Non-limiting examples of the detection device may include radar that scans the surroundings of the automobile 1 by ultrasonic waves. In this case, the space image may be a two-dimensional image as with the captured image, or alternatively, the space image may be a three-dimensional image, e.g., a curved image. Even in the case of the three-dimensional image, e.g., the curved image, applying similar processing to the forgoing example embodiments to, for example, approximation processing is expected to make it possible to obtain highly accurately the relative position, the relative direction, and the relative interval of the object. The approximation processing utilizes local planarity in the image region of the object and its surroundings.

The object estimation device 10 illustrated in FIGS. 2A and 2B is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the object estimation device 10 illustrated in FIGS. 2A and 2B. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the object estimation device 10 illustrated in FIGS. 2A and 2B.

The invention claimed is:

1. An object estimation device comprising:
an acquisition unit, mounted on a vehicle, configured to acquire a space image including an object present in a space around the vehicle; and
an estimation unit configured to:
estimate an image region including the object in the space image on a basis of a portion or all of the space image;
when a front or back of the object included in the image region faces the vehicle in a confronted posture, enclose the image region with an estimation frame such that all edges of the estimation frame are in contact with the image region; and
when the object included in the image region is in an oblique posture with respect the vehicle, enclose the image region with the estimate frame such that at least one of the edges of the estimation frame is not in contact with the image region.

2. The object estimation device according to claim 1, wherein
the estimation unit is configured to machine-learn relevance between the space image including the object present in the space and data of image region that indicates a location of an object in the space image, to estimate the image region including the object in the space image.

3. The object estimation device according to claim 2, wherein
the estimation unit is configured to machine-learn or estimate the estimation frame that encloses the image region of the object in the space image.

4. The object estimation device according to claim 3, wherein
when the object included in the image region is in the oblique posture, the estimation unit is configured to machine-learn or estimate the estimation frame a portion or all of which is apart from the image region of the object.

5. The object estimation device according to claim 3, wherein
when the object included in the image region is in the oblique posture, the estimation unit is configured to machine-learn or estimate the estimation frame a portion or all of which is apart from the image region of the object, differently from when the front or back of the object included in the image region faces the vehicle in the confronted posture.

6. The object estimation device according to claim 4, wherein
when the object included in the image region is in the oblique posture, the estimation unit is configured to machine-learn or estimate the estimation frame a portion or all of which is apart from the image region of the object, differently from when the front or back of the object included in the image region faces the vehicle in the confronted posture.

7. The object estimation device according to claim 1, wherein
the estimation unit is configured to machine-learn, with reference to a two-dimensional frame of a rectangular shape, the estimation frame provided upright with respect to the two-dimensional frame, to enclose the image region with the estimation frame, and
the two-dimensional frame encloses the object in a plan view of the object included in the space image.

8. The object estimation device according to claim 1, wherein
the estimation unit is configured to machine-learn or estimate the estimation frame of a rectangular shape that is in contact with a road surface and upright from the road surface in the space image, or the estimation frame of a rectangular shape that is in contact with the road surface in the space image.

9. The object estimation device according to claim 1, wherein
the object is another vehicle, and
when the another vehicle included in the image region is in the oblique posture, the estimation unit is configured to machine-learn or estimate at least the estimation frame and another estimation frame out of: a first estimation frame that corresponds to a confronted face of the another vehicle in the oblique posture; a second estimation frame that corresponds to an adjacent face to the confronted face of the another vehicle in the oblique posture; and a third estimation frame that corresponds to the confronted face and the adjacent face of the another vehicle in the oblique posture.

10. The object estimation device according to claim 1, further comprising a post-processing unit configured to generate a position, a direction, a distance, or any combination thereof with respect to the object present in the space, with use of data of the image region generated by the estimation unit.

11. The object estimation device according to claim 10, wherein
the object is another vehicle, and
when the another vehicle included in the image region is in the oblique posture, the post-processing unit is configured to generate the position, the direction, the distance, or any combination thereof with respect to the another vehicle in the oblique posture, with use of at least the estimation frame and another estimation frame out of: a first estimation frame that corresponds to a confronted face of the another vehicle in the oblique posture; a second estimation frame that corresponds to an adjacent face to the confronted face of the another vehicle in the oblique posture; and a third estimation frame that corresponds to the confronted face and the adjacent face of the another vehicle in the oblique posture.

12. The object estimation device according to claim 10, wherein
the object is another vehicle, and
the post-processing unit is configured to,
identify, as a plurality of road surface point positions, road surface point positions on both lateral sides of the image region of the another vehicle in the oblique posture, on a basis of the at least two estimation frames, wherein the plurality of the road surface point positions is obtained by mapping corners of a two-dimensional frame of a rectangular shape onto a road surface, the two-dimensional frame of the rectangular shape enclosing the another vehicle in a plan view of the another vehicle in the space image;
identify an intermediate road surface point position between the road surface point positions on both lateral sides, with reference to the road surface point positions on both lateral sides identified with respect to the image region of the another vehicle in the oblique posture; and
generate the position, the direction, the distance, or any combination thereof with respect to the another vehicle present in the space, from the road surface point positions on both lateral sides and the intermediate road surface point position identified.

13. An object estimation method for an object estimation device configured to estimate image region including an object in a space image including the object present in a space, the object estimation method comprising:
acquiring the space image including the object present in the space; and
estimating the image region on a basis of a portion or all of the space image,
when a front or back of the object included in the image region faces the vehicle in a confronted posture, enclosing the image region with an estimation frame such that all edges of the estimation frame are in contact with the image region; and
when the object included in the image region is in an oblique posture with respect to the vehicle, enclosing the image region with the estimate frame such that at least one of the edges of the estimation frame is not in contact with the image region.

14. A vehicle comprising:
an imaging device configured to capture a space around a vehicle;
a processor configured to carry out processing on a captured image by the imaging device; and
a control processor configured to control travel of the vehicle with use of a result of the processing by the processor,
the processor including
an acquisition unit configured to acquire the captured image as a space image including an object present in the space,
an estimation unit configured to estimate image region including the object in the space image on a basis of a portion or all of the space image, and
a post-processing unit configured to generate a position, a direction, a distance, or any combination thereof with respect to the object present in the space, with use of data of the image region generated by the estimation unit, wherein the estimation unit is further configured to:
- when a front or back of the object included in the image region faces the vehicle in a confronted posture, enclose the image region with an estimation frame such that all edges of the estimation frame are in contact with the image region; and
- when the object included in the image region is in an oblique posture with respect the vehicle, enclose the image region with the estimate frame such that at least one of the edges of the estimation frame is not in contact with the image region, and the control processor is configured to decide, with use of the position, the direction, the distance, or any combination thereof with respect to the image region including the object present in the space estimated by the estimation unit as the result of the processing by the processor, a course or a travelable range of the vehicle to control the travel of the vehicle, the course or the travelable range inhibiting the vehicle from coming into contact with the object included in the oblique posture in the space image.

15. An object estimation device comprising circuitry, included in a vehicle, configured to:
- acquire a space image including an object present in a space around the vehicle; and
- estimate an image region including the object in the space image on a basis of a portion or all of the space image;
- when a front or back of the object included in the image region faces the vehicle in a confronted posture, enclose the image region with an estimation frame such that all edges of the estimation frame are in contact with the image region; and
- when the object included in the image region is in an oblique posture with respect the vehicle, enclose the image region with the estimate frame such that at least one of the edges of the estimation frame is not in contact with the image region.

* * * * *